United States Patent
Bernard et al.

(10) Patent No.: US 8,746,500 B2
(45) Date of Patent: Jun. 10, 2014

(54) ASSEMBLY HAVING A SELF-CLAMPING SKIRT FOR CLOSING AN ANNULAR COLLAR OR CONNECTING TO SAME, WHICH CAN BE RAPIDLY POSITIONED AND REMOVED, AND USED IN THE BIOPHARMACEUTICAL FIELD

(75) Inventors: Frederic Bernard, La Cadiere D'Azur (FR); Eric Chevalier, Paris (FR)

(73) Assignee: Sartorius Stedim FMT S.A.S., Aubagne (FR)

( * ) Notice: Subject to any disclaimer, the term of this patent is extended or adjusted under 35 U.S.C. 154(b) by 0 days.

(21) Appl. No.: 13/254,917

(22) PCT Filed: Mar. 5, 2010

(86) PCT No.: PCT/FR2010/050382
§ 371 (c)(1),
(2), (4) Date: Oct. 14, 2011

(87) PCT Pub. No.: WO2010/100387
PCT Pub. Date: Sep. 10, 2010

(65) Prior Publication Data
US 2012/0038151 A1   Feb. 16, 2012

(30) Foreign Application Priority Data
Mar. 6, 2009 (FR) ...................................... 09 51428

(51) Int. Cl.
*B65D 43/02*  (2006.01)
*B65D 41/16*  (2006.01)
(52) U.S. Cl.
CPC ........ *B65D 43/0216* (2013.01); *B65D 43/0218* (2013.01); *B65D 41/16* (2013.01)
USPC .............. 220/797; 220/796; 220/780; 215/43
(58) Field of Classification Search
CPC ........... B65D 43/0216; B65D 43/0218; B65D 43/0222; B65D 43/0264; B65D 41/16
USPC ......... 220/796, 797, 352, 805, 780, 793, 306; 285/363; 29/428; 215/42, 43, 45, 321, 215/319, 317
See application file for complete search history.

(56) References Cited

U.S. PATENT DOCUMENTS 836,782 A * 11/1906 Pugerud .................... 215/336
(Continued)

FOREIGN PATENT DOCUMENTS

EP    0 800 480    10/1997
EP    0 865 382     9/1998
(Continued)

OTHER PUBLICATIONS

International Search Report dated Sep. 15, 2010, corresponding to the PCT application.

*Primary Examiner* — Robert J Hicks
*Assistant Examiner* — Kareen Rush
(74) *Attorney, Agent, or Firm* — Young & Thompson

(57) ABSTRACT

A mounting assembly is provided including a first piece mounted in a fixed, detachable, and sealed manner, on a rigid, annular collar of a second piece having an end opening. The first piece includes an annular peripheral wall having an inner face configured to contact an outer face of the collar. The first piece includes a transverse wall that can enter the opening, and an annular wall forming a skirt, the inner face of the skirt including a larger diameter part, a smaller diameter part, and an intermediate part configured to contact with conjugated parts of the outer face by clamping. The transverse wall and the skirt form one component and are made of a highly flexible material enabling the first piece to be brought into an intermediate state in which the first piece is enlarged to be removed from the second piece, while retaining elastic deformation.

29 Claims, 18 Drawing Sheets

(56) References Cited

U.S. PATENT DOCUMENTS

| | | | |
|---|---|---|---|
| 997,807 A * | 7/1911 | Hammer | 215/336 |
| 2,767,711 A | 10/1956 | Ernst | |
| 3,421,651 A * | 1/1969 | Hendrickson et al. | 220/796 |
| 3,421,653 A * | 1/1969 | Whaley | 220/780 |
| 4,930,647 A * | 6/1990 | Dutt et al. | 215/252 |
| 5,350,080 A | 9/1994 | Brown et al. | |
| 5,988,422 A | 11/1999 | Vallot | |
| 6,030,578 A | 2/2000 | McDonald | |
| 6,068,031 A | 5/2000 | Lataix et al. | |
| 6,708,377 B2 | 3/2004 | Maunder | |
| 7,168,459 B2 | 1/2007 | Bibbo et al. | |
| 7,384,078 B2 | 6/2008 | Elliott | |
| 7,568,585 B2 * | 8/2009 | Baughman et al. | 215/254 |
| 7,731,050 B2 * | 6/2010 | Parks et al. | 220/301 |
| 2002/0043512 A1 * | 4/2002 | Sandor et al. | 215/43 |
| 2002/0109355 A1 | 8/2002 | Elliott | |
| 2004/0191369 A1 | 9/2004 | Veillon | |
| 2008/0169262 A1 * | 7/2008 | Ekkert | 215/250 |

FOREIGN PATENT DOCUMENTS

| | | |
|---|---|---|
| EP | 0 997 155 | 5/2000 |
| EP | 1 336 572 | 8/2003 |
| EP | 1 352 851 | 10/2003 |
| EP | 1 425 227 | 6/2004 |
| EP | 1 666 368 | 6/2006 |
| EP | 1 230 505 | 7/2008 |
| FR | 2 781 202 | 1/2000 |
| WO | 97/18994 | 5/1997 |
| WO | 2005/021396 | 3/2005 |
| WO | 2007/122648 | 11/2007 |

\* cited by examiner

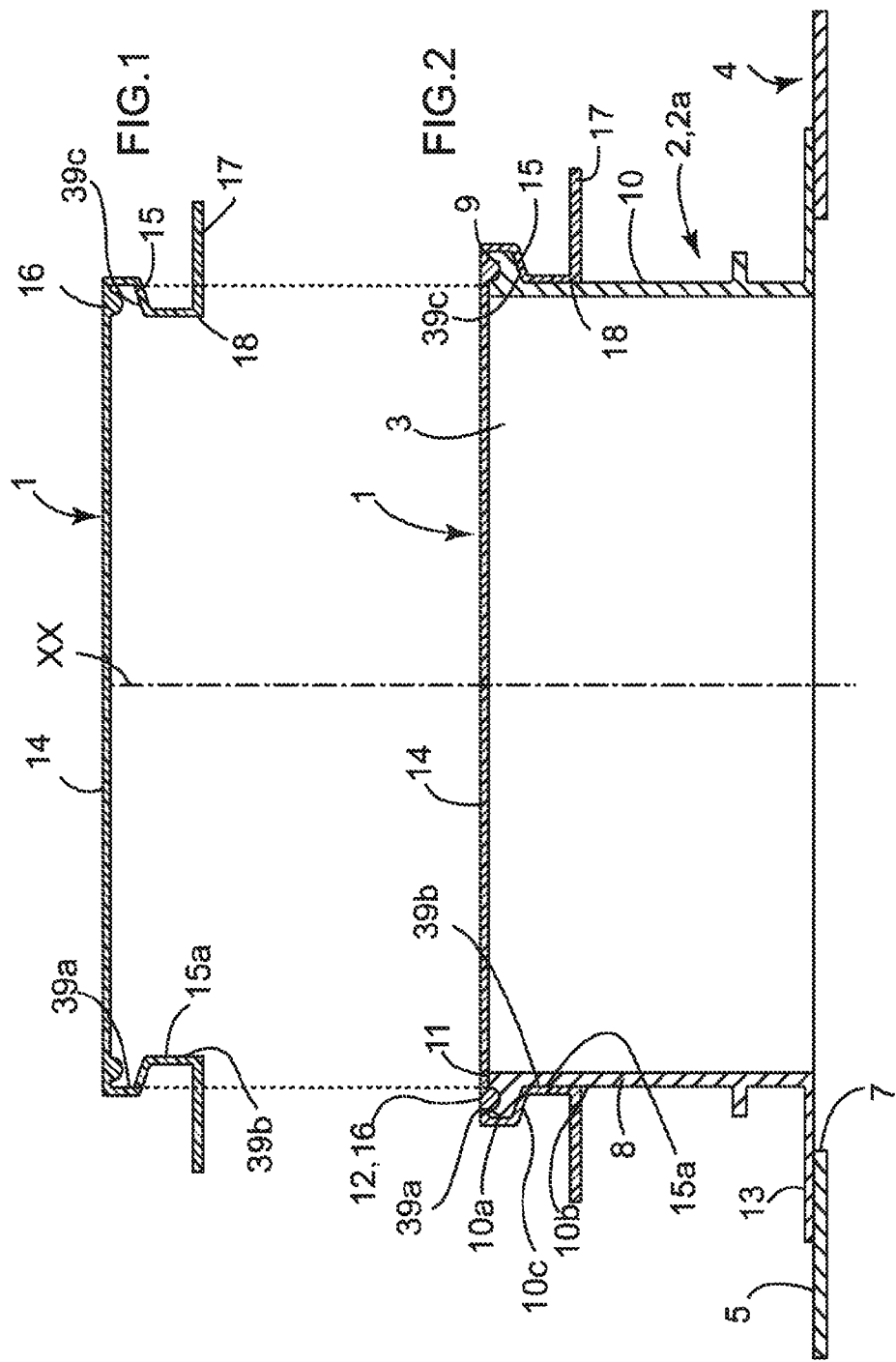

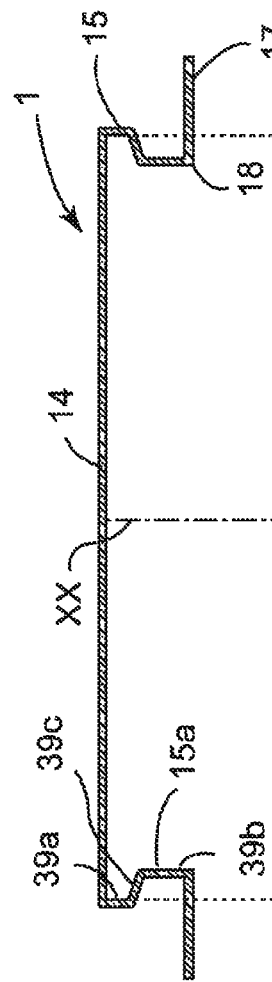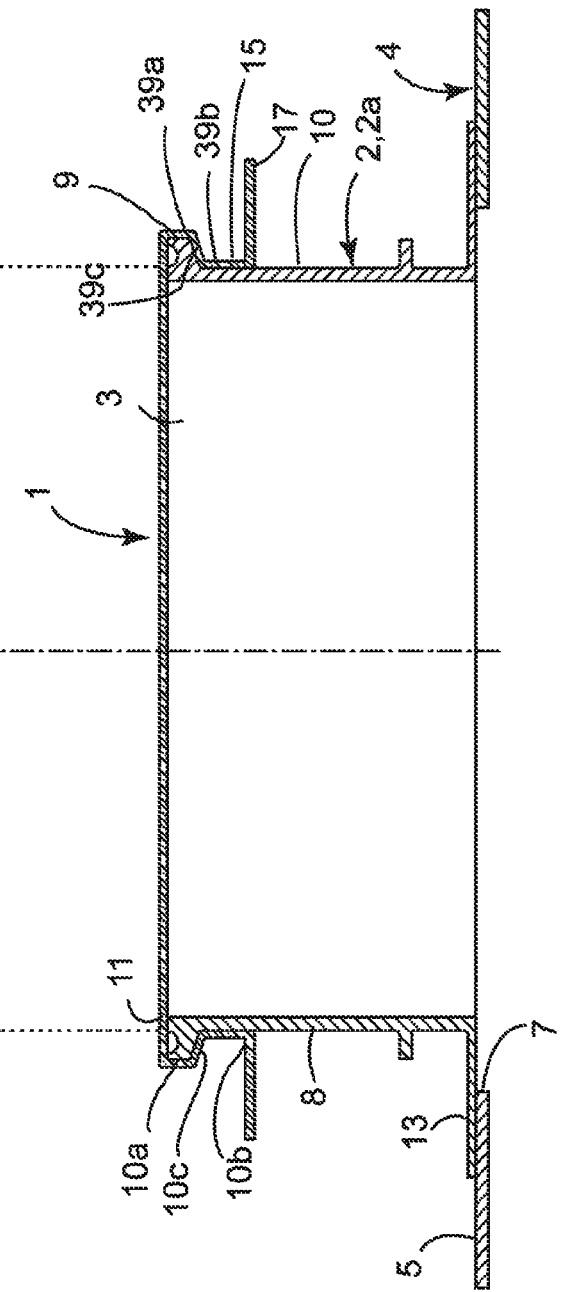

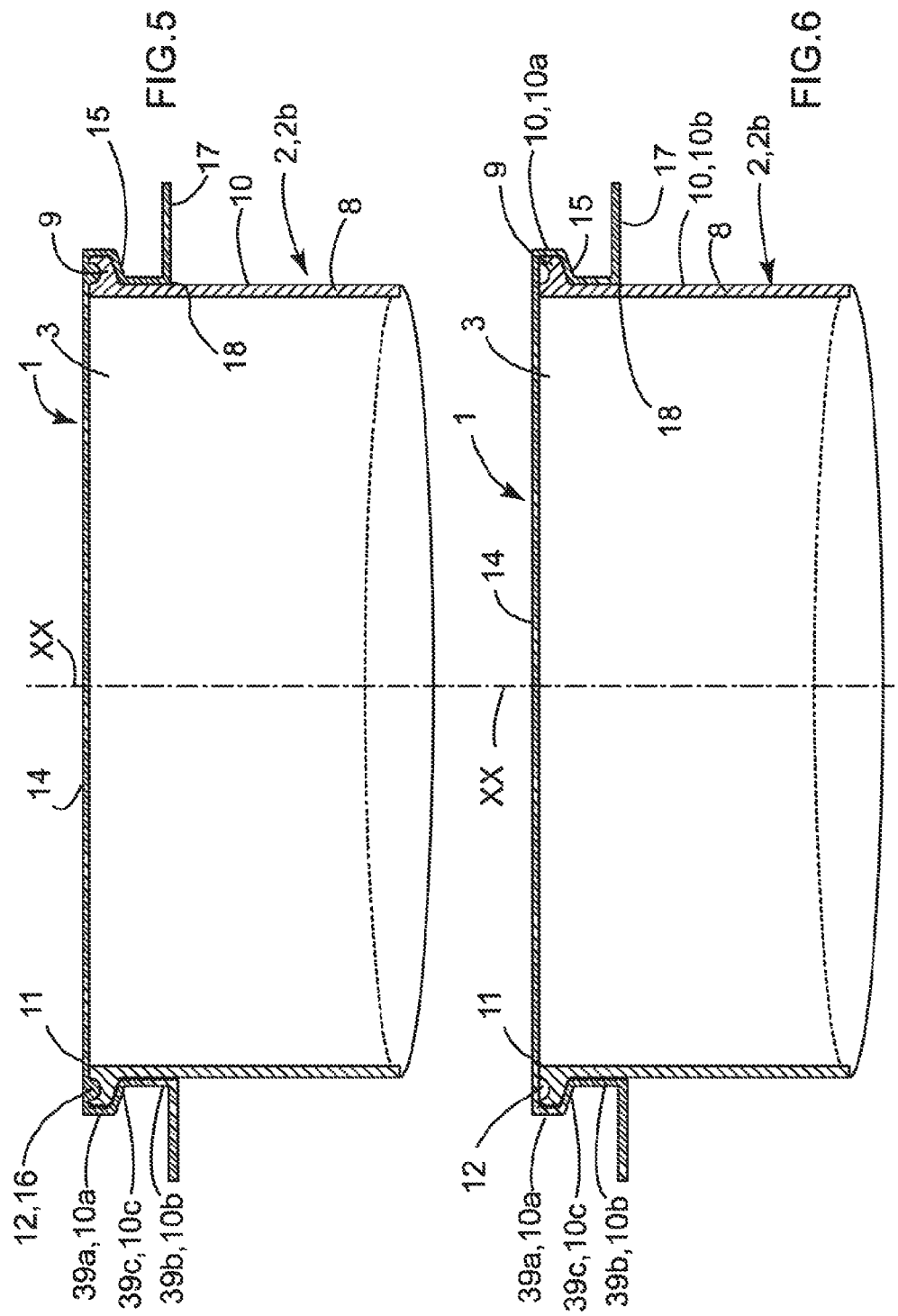

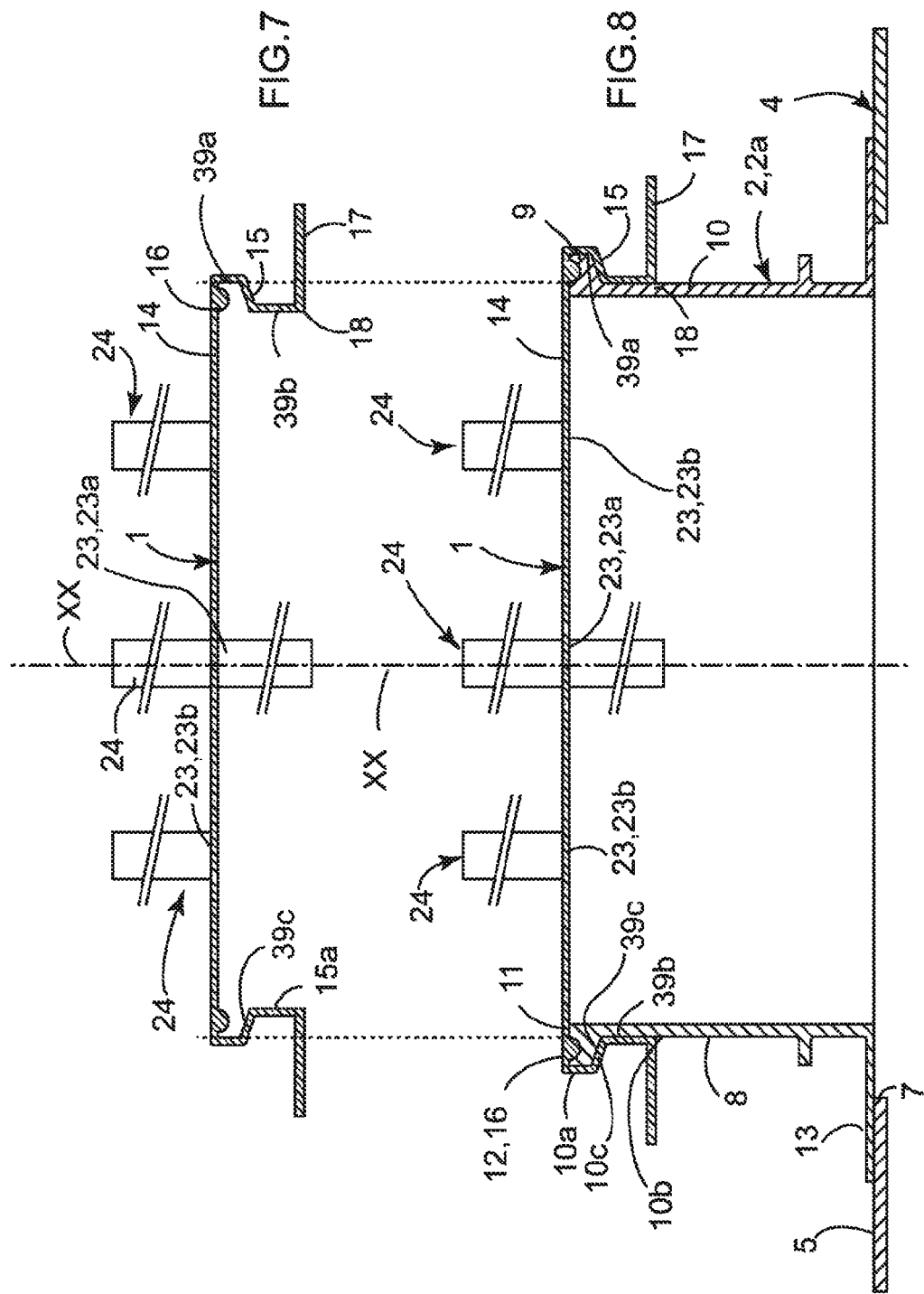

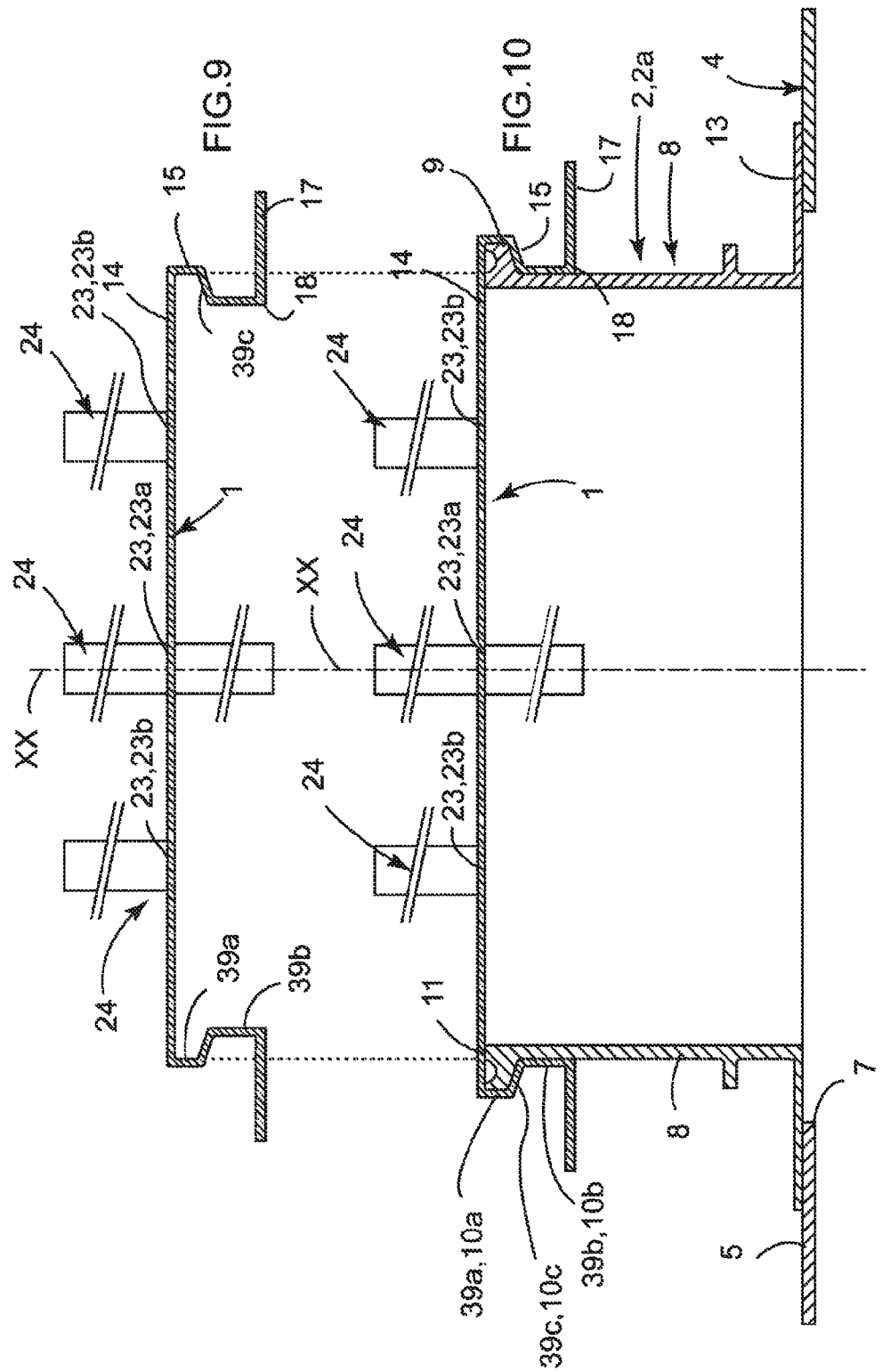

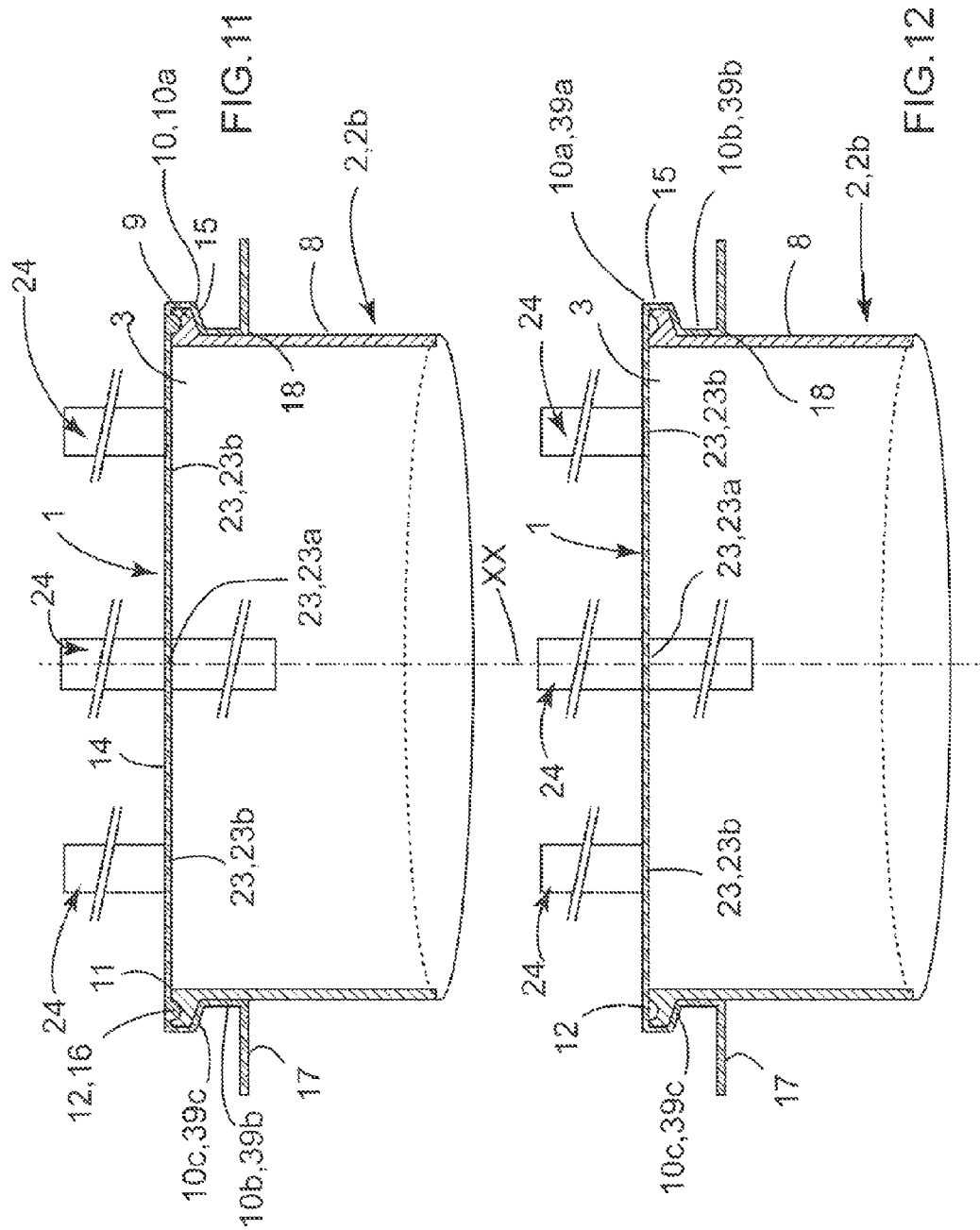

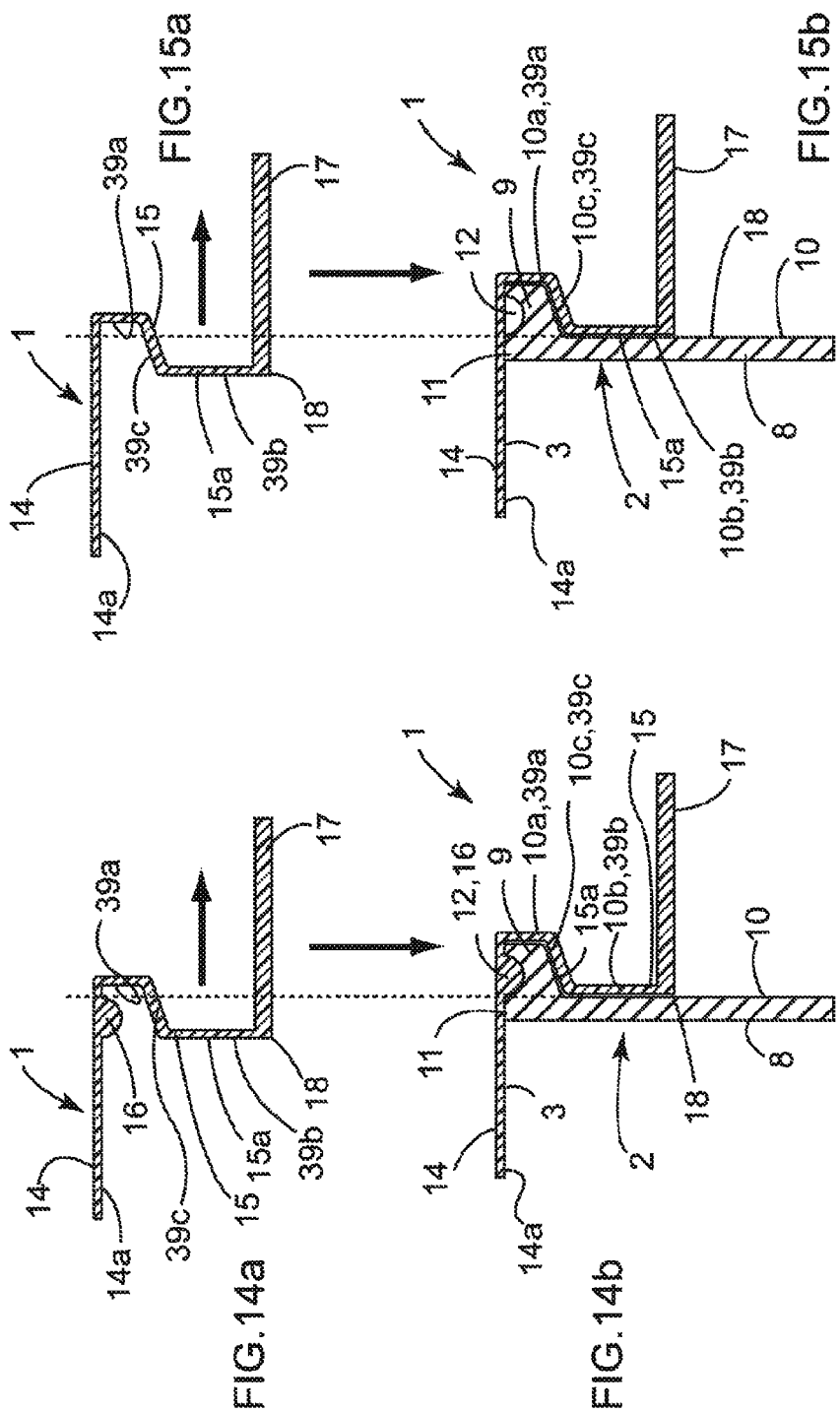

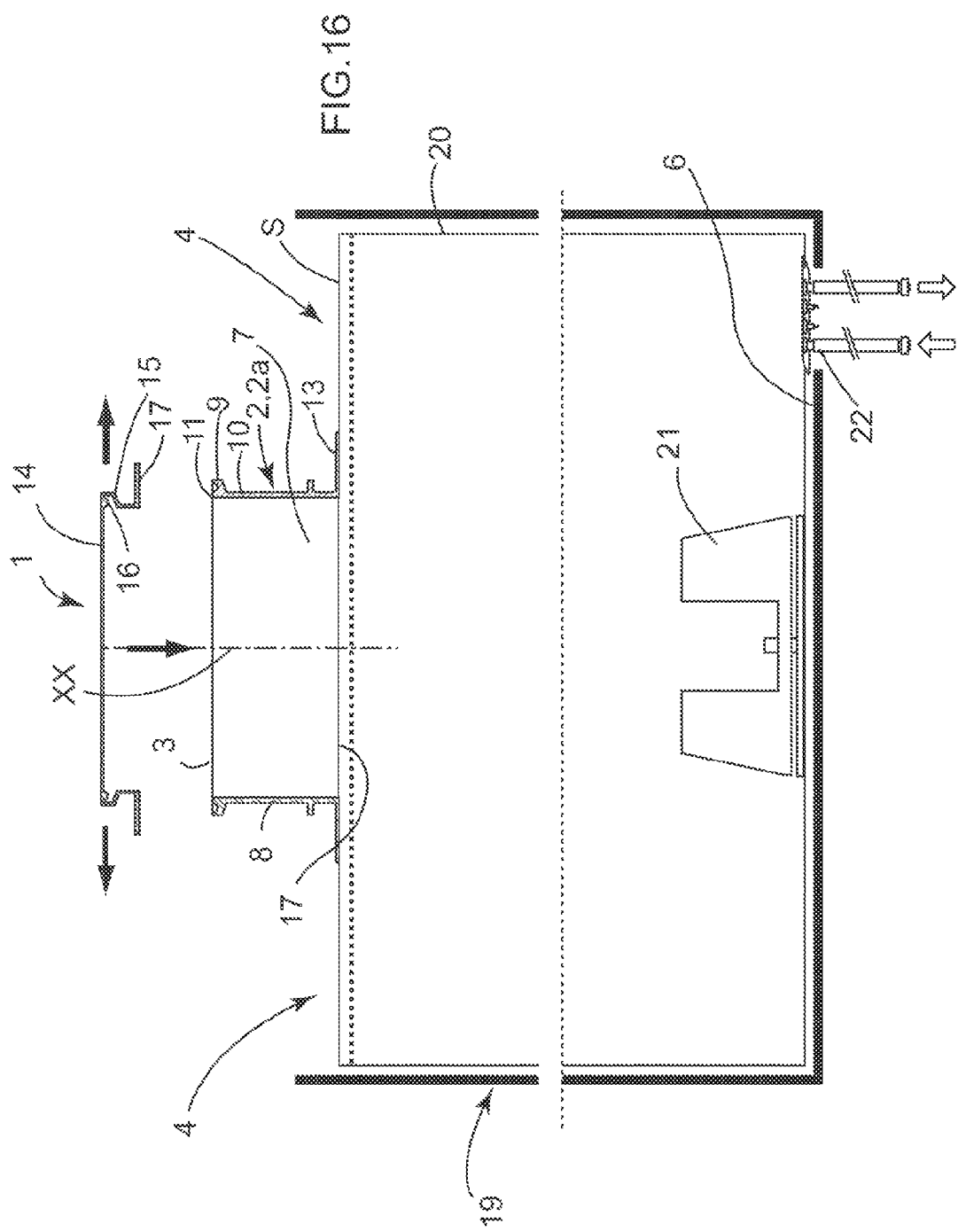

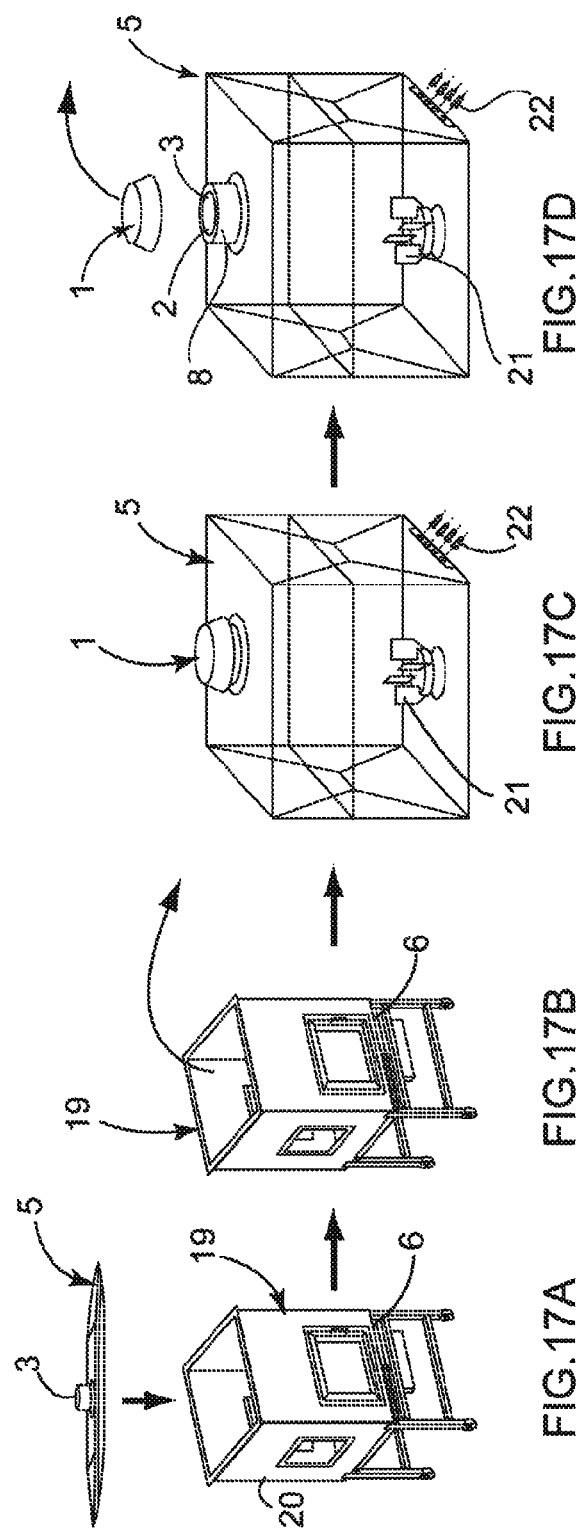

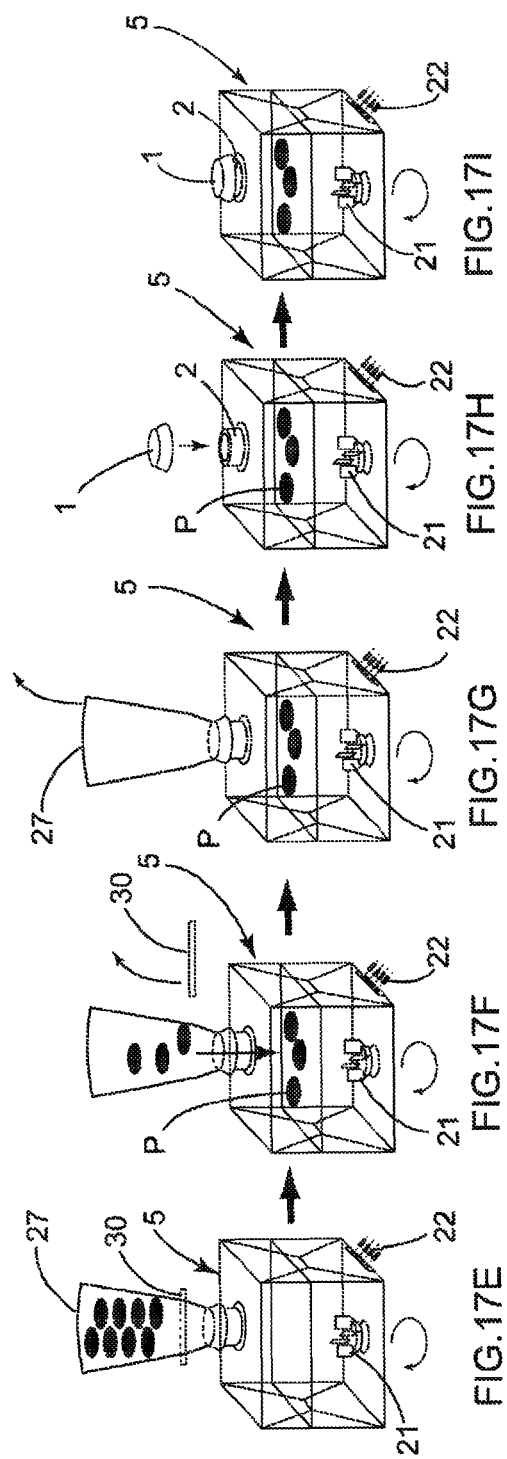

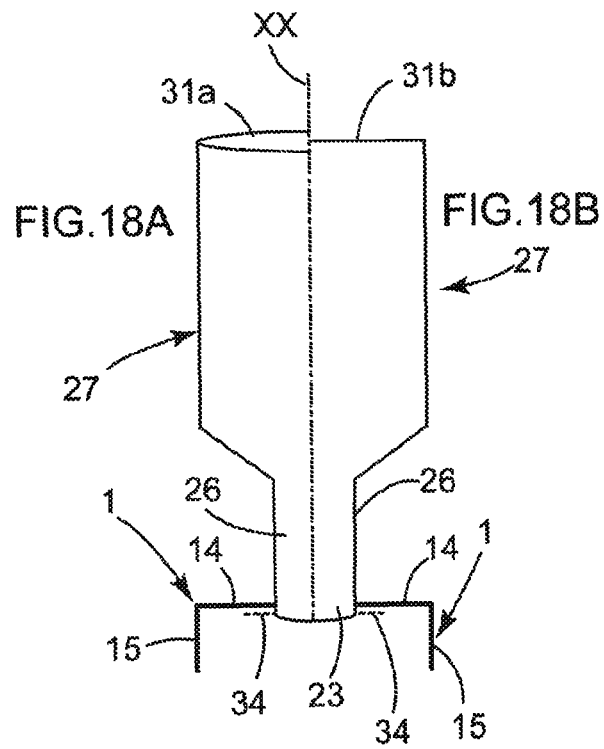
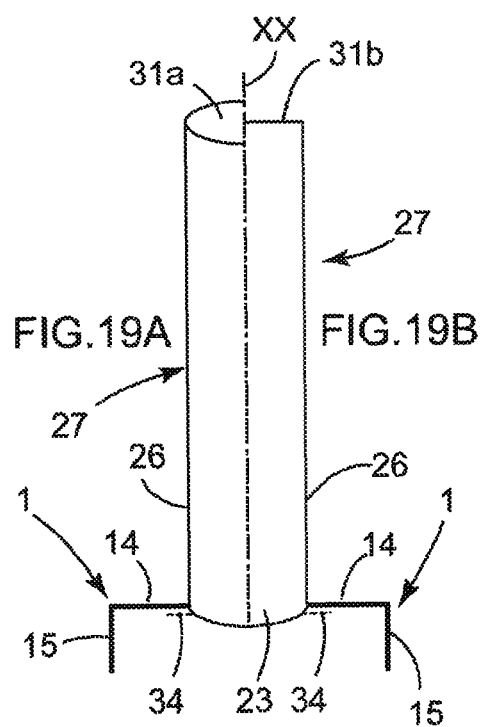

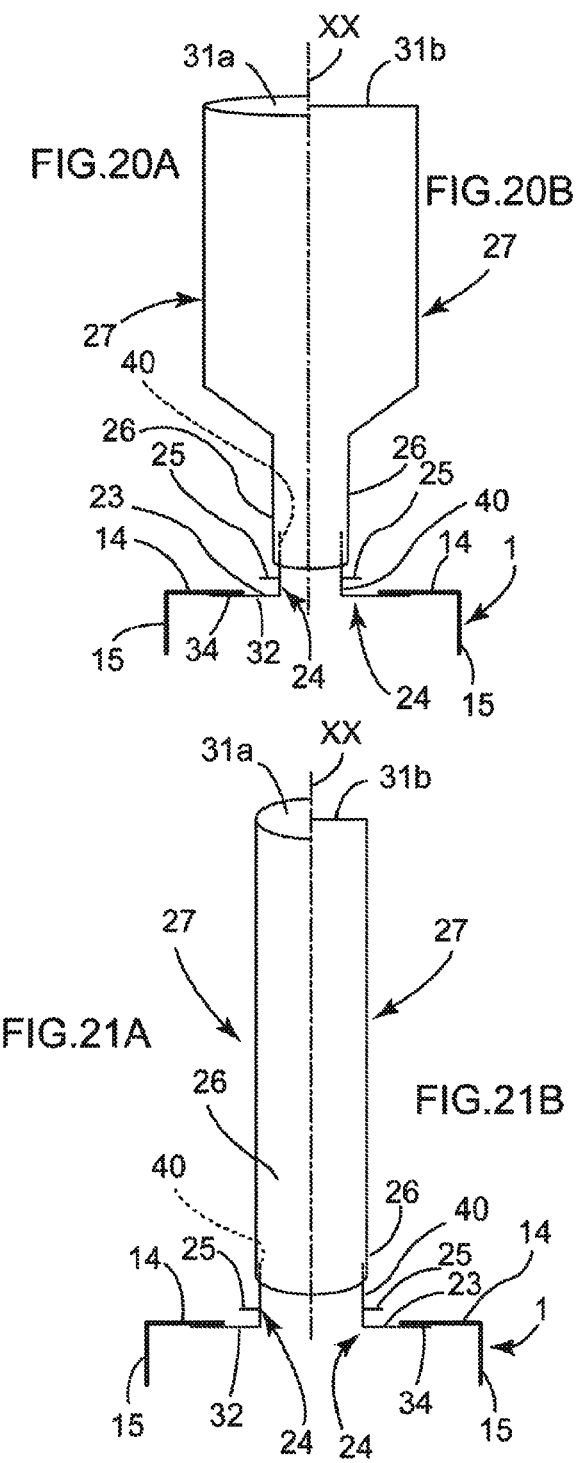

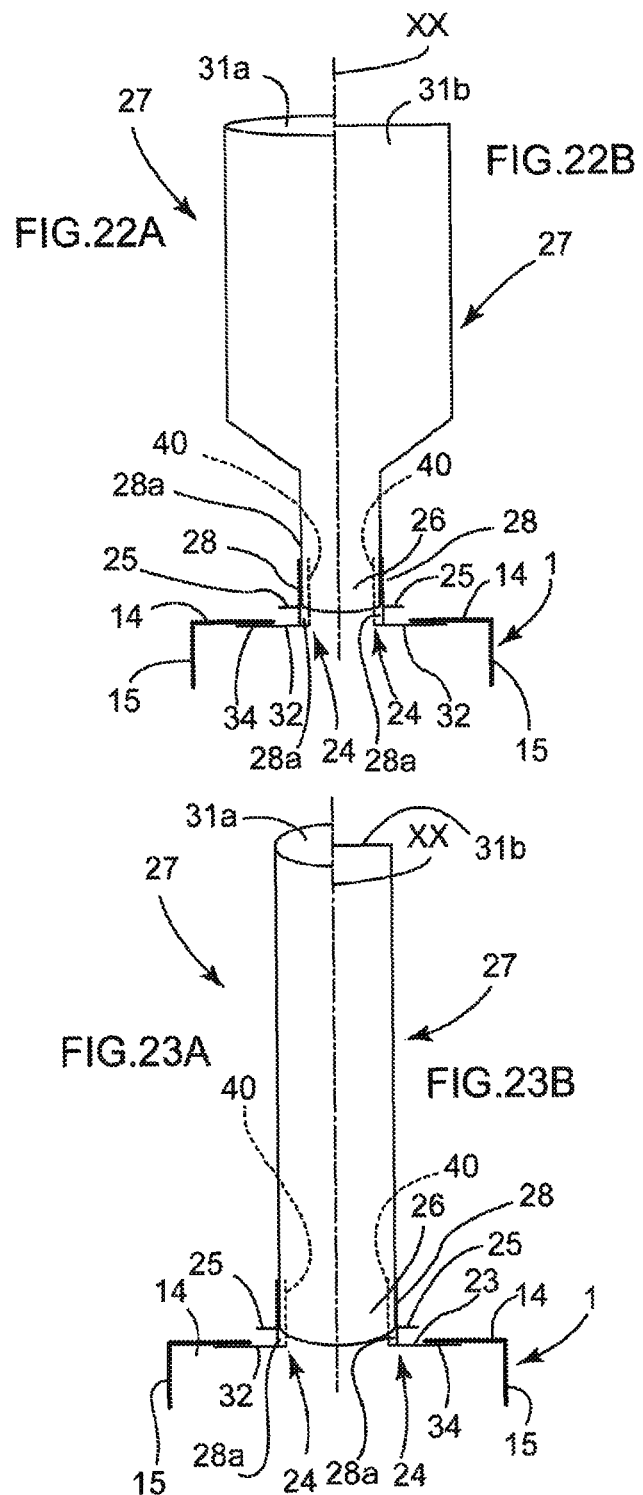

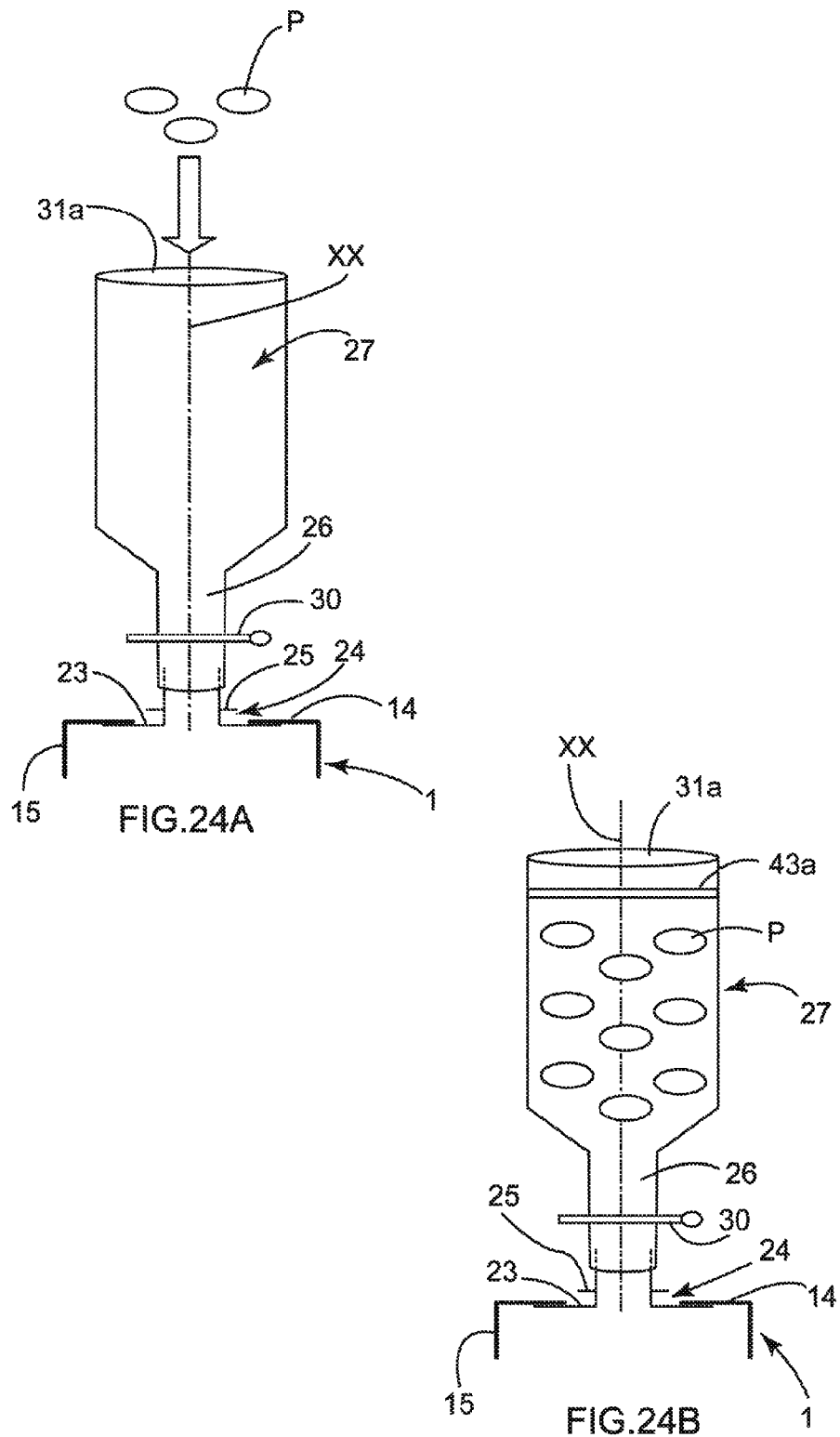

ASSEMBLY HAVING A SELF-CLAMPING SKIRT FOR CLOSING AN ANNULAR COLLAR OR CONNECTING TO SAME, WHICH CAN BE RAPIDLY POSITIONED AND REMOVED, AND USED IN THE BIOPHARMACEUTICAL FIELD

BACKGROUND OF THE INVENTION

1. Field of the Invention

The invention relates to mountings with self-tightening skirts on an annular collar, in a stationary, removable and airtight manner, with quick installation and removal, specially designed for the biopharmaceutical field. The purpose of such mountings is either the sealing of the end opening formed by the rigid collar or the connection—with communication—to this collar.

2. Description of the Related Art

It is known that in the biopharmaceutical field, the need exists to be able to mount—namely to seal or to connect with communication—in a stationary, removable and airtight manner, pieces such as—or more precisely parts of—receptacles, tubes or ports that are integrated with more or less complex units that can comprise multiple receptacles, multiple tubes, and multiple functional means, combined with one another.

For the sake of simplicity in the presentation, it is suitable to name the two pieces that are thus to be mounted or are thus mounted "first piece" and "second piece." It is also acknowledged that the object of the mounting, also referred to as an assembly, is either sealing or connection with communication, and that consequently mounting or assembly is defined as either to seal or to connect with communication.

In a traditional way, such receptacles for biopharmaceutical use were made of stainless steel and connected to one or more tubes made of plastic material or stainless steel by means of one or more clamps acting as a flange, comprising two jaws that are connected to one another, for example articulated, and tightening and locking means. The application of such embodiments in the case of receptacles for biopharmaceutical use comprising a pocket made of plastic material has been extended. These pockets are either relatively thin (sometimes called "pillow" pockets or "2D" pockets—D meaning dimensions) or, as the document FR-A-2 781 202 discloses, have two large walls and lateral gussets, so as to be able, once expanded, to assume a three-dimensional shape and to have a volume of 50 liters and more (sometimes called a 3D pocket). Such clamps, also known under the name of "tri-clamp," are the object of numerous variant embodiments, such as those described in particular in the documents EP-A-1 230 505, U.S. Pat. Nos. 6,708,377, and 7,384,078, whereby this list is not limiting. Such a tri-clamp conventionally comprises a tightening cuff that at each of its two corresponding ends has a bulge, a tightening element working structurally and functionally with the two bulges opposite. The object of the documents EP-A-0 997 155 and EP-A-1 352 851 is the implementation of such clamps or tri-clamps.

In line with the ISO 2852: 1993 Standard, one of the two pieces that is the object of the mounting or assembly, for example the first piece, has an annular part that has an end bulge toward the exterior, in the end edge of which an annular groove is provided that accommodates a sealing bead that is also annular. The other piece, then the second piece, also has an annular part that has an end bulge toward the exterior. The clamp, flange or tri-clamp is designed to be tightened on the two annular parts by keeping them firmly against one another to prevent their inadvertent disassembly and to ensure the sealing.

These embodiments have a certain number of limits and drawbacks. These tri-clamps, which are conventionally for multiple use, are expensive. They are ill-suited to the increasingly common and desired case of single use (per se or for a process overall). Most often, their interior diameter does not exceed about ten centimeters, whereas more and more frequently, the use of biopharmaceutical devices that are larger in size, in particular involving openings of containers, is considered. Their installation often proves difficult, long and hazardous, to the extent where the operator has to hold the tri-clamp and maneuver it (for closing it) and simultaneously hold at least one, and even two, pieces, while keeping them perfectly positioned relative to one another. These drawbacks are unacceptable when, as is more and more often desired, the two pieces have to be able to be assembled quickly and more easily.

Ports that have external holding teeth (sometimes called "hose-barbs") are also known—for example from document U.S. Pat. No. 5,350,080. These embodiments have a number of limitations and drawbacks. For example, their diameter is limited and does not allow large sizes, and their installation, with force, is problematic.

It is also known that in the biopharmaceutical field, there exists the need for being able to mount or assemble receptacles with sterile chambers for the purpose of a connection with communication in a stationary, rigid, removable and airtight manner. To do this, most often complex systems are used such as those that are described in the documents EP-A-0 800 480 and EP-A-0 865 382. These embodiments are well suited to their use but exclude single use.

One skilled in the art also knows that there exist a number of embodiments of sealing covers, in which a first piece that forms a cover comprises a transverse wall and a peripheral annular wall that forms a skirt, and a second piece for which the cover is designed comprises an annular collar and an end opening (EP-A-1 336 572, EP-A-1 425 227, EP-A-1 666 368, WO 2005/021396, WO 2007/122648). These embodiments are specific to their use and provide answers to individual problems that are not those of the biopharmaceutical field. For example, and in a nonlimiting manner, the object of these embodiments is a mass production designed for everyone, and the mounting or assembly is designed to be able to hold up for a significant period (up to several years) or, conversely, the mounting or assembly is disposable and sealing is not a critical factor. These embodiments therefore cannot be transferred to the biopharmaceutical field for mounting or assembling—in a stationary, rigid, removable and airtight manner—pieces such as receptacles, tubes or ports, or parts thereof, with inherent requirements in the field being considered and with the uses in question.

The document U.S. Pat. No. 2,767,711 that relates to a package for an eye medication is also known from the state of the art. The package comprises a container and a cover equipped with a bead with a general rounded shape in a straight cross-section. The cover further comprises a central part, an annular projection directed upward adjacent to the central part, a curved collar, like the bead, and becoming engaged on it, a terminal lip that by its end comes against the exterior surface of the lateral wall of the container.

However, this document does not provide the fact that the interior surface of the transverse wall comprises a part that is mated with an end edge of the collar that can be applied against it and that can participate in the sealing between the two pieces. Conversely, in the document U.S. Pat. No. 2,767, 711, the collar is rounded and therefore lacks an end edge.

In addition, it is no longer provided that the interior surface of the skirt includes a cylindrical part of larger diameter adjacent to the transverse wall, a cylindrical part of smaller diameter separated from the transverse wall, and a tilted, tapered intermediate part, such that, in the active state where the first piece is mounted on the second piece, these parts of the interior surface of the skirt come respectively into contact with elastic holding tightening and sealing on the mating parts of the exterior surface of the collar of the second piece. Conversely, this document provides a curved skirt with a circular shape in cross-section and a terminal lip that comes against the exterior surface of the lateral wall of the container—not by its internal surface but by its terminal field.

Such an embodiment therefore has in particular the drawback that it is not suitable for openings of large diameter.

There therefore exists an unsatisfied need for mounting or assembling—namely sealing or connecting with communication—in a stationary, removable and airtight manner, a first piece and a second piece, such as receptacles, tubes or ports or more precisely parts thereof, used in processes and devices of the biopharmaceutical field with—as inherent requirements—a possibility of single use (per se or for a process overall), a low cost, an installation (i.e., mounting or assembly) and disassembly, an airtight mounting or assembly, a possibility of application in the case of biopharmaceutical devices whose openings involved by the connection can reach about fifty centimeters in diameter, an easy, quick and reliable installation. There is also a need for sets of pieces (a first piece and a second piece) that can be mounted or assembled as indicated and that proceed from a "versatile" idea allowing a great diversity of functions and applications in the biopharmaceutical field. In this field, and in addition to what has already been indicated, it is essential that the materials that are used are such that the components and devices produced from them keep their integrity during sterilization, for example by γ radiation, that the devices that are used meet the approval of the health authorities and are compatible with a white room use. Furthermore, most often, the sets of pieces considered here (first piece and second piece) are designed, within the framework of standard use, to accommodate fluids at atmospheric pressure or close to atmospheric pressure and at positive temperatures between temperatures that are close to 0° C. up to temperatures on the order of 40° C.

BRIEF SUMMARY OF THE INVENTION

The invention has as its object to meet this need that corresponds to specific requirements of the biopharmaceutical field.

For this purpose, according to a first aspect, the object of the invention is a piece that is specially designed in the biopharmaceutical field to be mounted in a stationary and rigid, removable and airtight manner, on a rigid annular collar of a second piece that has one end opening, the first piece, of the XX axis, comprising a transverse wall that can come into the opening and a peripheral annular wall that forms a skirt, whose interior surface is able to come into contact with the exterior surface of the collar, with the transverse wall and the skirt, in one piece, being made of a material that offers an inherent sealing for the biopharmaceutical field and having a high degree of flexibility, making it possible for the first piece—that in the inactive state has a specified natural shape—to be curved without being degraded in such a way that starting from its inactive state, it can be stretched transversely and expanded to be able to be slipped onto or slipped off of the second piece, characterized by the fact that, in combination:

The interior surface of the transverse wall, continuous and solid or having at least one passage opening, comprises an essentially flat central zone and a marginal zone positioned on the periphery of the first piece and having an essentially flat continuity relative to the central zone so as to form a part that is mated with an end edge of the collar that can be applied against it and that can participate in the sealing between the two pieces;

The interior surface of the skirt includes a cylindrical part of larger diameter adjacent to the transverse wall, a cylindrical part of smaller diameter that is separated from the transverse wall, and a tilted, tapered intermediate part such that in the active state where the first piece is mounted on the second piece, the parts of the skirt respectively come into contact with elastic holding tightening and sealing on the mating parts of the exterior surface of the collar of the second piece;

With the first piece, with quick installation and removal, having sealing of the second piece when the transverse wall is continuous and solid, or being connected with communication to the second piece, when the transverse wall comprises a passage opening.

According to one embodiment, the intermediate part of the interior surface of the skin has a tapered shape, and in particular has a tilt on the order of 45° on the XX axis.

According to one embodiment, the transverse wall has a smaller thickness than that of the skirt and/or the thickness of the skirt facing the part of larger diameter is greater than the thickness facing the part of smaller diameter.

According to one embodiment, in the case where the transverse wall comprises a passage opening, the first mounting piece also comprises a tubular piece delimiting the opening of the transverse wall that is made integral with the transverse wall for forming a rigid unit that extends toward the exterior and/or the interior of the transverse wall. The first piece, equipped with the tubular piece, ensures a function of connection and rigid attachment and passage or transfer, with the tubular piece, extending toward the exterior of the transverse wall, being able to accommodate and to attach—rigidly and in an airtight manner—the annular end part of a third piece.

According to the embodiments, such a tubular piece is rigid or has a certain deformation capacity.

According to one embodiment, such a tubular piece, extending toward the exterior of the transverse wall, comprises a tubular wall for the accommodation and the rigid and airtight attachment of the annular end part of the third piece and, at one end of the tubular wall, a collar for the rigid attachment to the part of the transverse wall that forms the edge of the opening with which it is equipped.

According to one embodiment, the tubular piece comprises—toward the exterior of its tubular wall—an exterior cylindrical wall, providing with this tubular wall an annular cylindrical housing that can accommodate the annular end part of the third piece.

According to one embodiment, the tubular piece comprises, forming a rigid unit with it, a transverse collar, directed toward the exterior, able to constitute a means of suspension of the third piece, working with a support wall that has a hole.

According to one embodiment, in the case where the transverse wall comprises a passage opening, a third piece is provided that has an annular end part, which is able to be, or is, attached directly to the part of the transverse wall that forms the edge of the opening.

According to the embodiments, the third piece has either a form of open pocket or not opposite the annular end part or a form of tube.

According to one embodiment, a closing piece combined with the third piece, if necessary the tubular piece, having as its function to open or to close the passage formed by the annular end part of the third piece, is provided.

According to one embodiment, the mounting piece comprises a first annular peripheral sealing means in the form of a rounded bead in a transverse straight cross-section and is located close to the skirt, with a second mating annular peripheral sealing means in the form of a rounded groove in a transverse straight cross-section being provided on the end edge of the collar.

According to one embodiment, the mounting piece can also comprise at least one external peripheral tab adjacent to the free edge of the skirt and integral with it, able to contribute to the installation and/or the removal of the first piece on and/or from the collar of the second piece.

According to one embodiment, the mounting piece is made of silicone or an equivalent material.

According to one embodiment, the mounting piece is made of a material that has a Shore hardness on the order of 55 ShA and an elastic stretching capacity that is based on the size difference of the mounting piece between its inactive state and its intermediate state, in such a way that as much in the intermediate state as in the active state, the mounting piece has an elastic deformation relative to its inactive state where it does not have an elastic deformation and that in the active state, its elastic deformation is such that the mounting piece elastically tightens the collar of the second piece to ensure holding with sealing.

According to one embodiment, the material that constitutes the mounting piece is anti-static.

According to a second aspect, the object of the invention is a unit, specially designed for the biopharmaceutical field, comprising a first mounting piece as it was just described and a second piece on which it is mounted in a stationary and rigid, removable and airtight manner. The second, hollow piece comprises an end opening that is delimited by a rigid annular collar that has, on the side of the opening, a bulge directed toward the exterior, the exterior surface of the collar comprising a part of larger diameter toward the bulge and the opening, a part of smaller diameter separated from the bulge and the opening, and an intermediate part, in such a way that in the active state where the first piece is mounted on the second piece, the parts of the skirt come into contact with elastic holding tightening and sealing on the mating parts of the exterior surface of the collar of the second piece, the first piece, with quick installation and removal on the second piece.

According to one embodiment, the second sealing means, such as an annular groove, is provided on the end edge of the collar that forms the bulge, with which, when it is provided, a first annular peripheral sealing means works in the form of a rounded bead in a transverse straight cross-section and located close to the skirt.

According to a first embodiment, the fact that the second piece is a port that is part of a storage and treatment receptacle, also comprising a pocket that has a bottom and, opposite the bottom, an opening that is designed to be combined rigidly, or is combined rigidly, to the second piece opposite its end opening.

According to one embodiment, such a pocket comprises a flexible lateral wall that can be found in two end states, respectively flat-folded and deployed, and in any intermediate state, and to be deformed for passing from one state to another.

According to one embodiment, the receptacle comprises, in an integrated manner, means for treatment of its contents.

According to one embodiment, the second piece that forms a port also constitutes means for protection of the treatment means, whereby their active internal part is essentially arranged in the internal space of the second piece that forms a port when the pocket is in the flat-folded state, whereby the peripheral part of the internal space of the second piece forms a port that forms a chamber for protection of the pocket and treatment means.

According to one embodiment, the treatment means are arranged at least in part in the interior of the pocket by being adjacent to its bottom, opposite the second piece that forms a port.

According to a second embodiment, the second piece is a tube.

According to a first embodiment of the unit, the transverse wall is continuous and solid, with the first piece being for sealing the second piece.

According to a second embodiment of the unit, the transverse wall comprises at least one passage opening, with the first piece being for connection with communication to the second piece.

According to one embodiment, the unit comprises a third piece that comprises an annular end part that is connected in a rigid and airtight manner to the first piece, directly or by means of the tubular piece that was already mentioned.

According to one embodiment, the unit also comprises a closing piece combined with the third piece, if necessary with the tubular piece, having as its function to open or to close the passage that is formed by the annular end part.

According to a third aspect, the object of the invention is a process for mounting or assembly of the first mounting piece at and on the second piece of a unit as it was just described, in which:

A first piece and a second piece that are not mounted or assembled with one another are used;

By an adequate, in particular manual external stress, at least on the skirt of the first piece, the latter is expanded by remaining in the elastic deformation range up to a diameter that is at least slightly larger than the maximum exterior diameter of the collar toward its opening;

The first piece is positioned opposite and in the axis of the second piece;

The skirt is slipped onto the collar, and the first piece is positioned axially on the second piece;

In this position, the first piece is no longer stressed;

So that, in this situation where the first piece, in the active state, is mounted or assembled on the second piece, the mating parts of the skirt come into contact with elastic holding tightening and sealing on the mating parts of the exterior surface of the collar of the second piece.

According to a fourth aspect, the object of the invention is a process for disassembly of the first mounting piece from the second piece of a unit as it was just described, in which:

A first piece and a second piece that are mounted or assembled with and on one another are used;

By an adequate, in particular manual, external stress, at least on the skirt of the first piece, the latter is expanded to a diameter that is at least slightly larger than the maximum exterior diameter of the collar toward the opening;

The first piece is slipped off of the second piece, until the two pieces are disassembled.

According to a fifth aspect, the object of the invention is a process for using a unit as described above with a foldable pocket, in which:
A receptacle for storage or treatment is used;
The starting point is a situation in which:
   The pocket of the receptacle is in the flat-folded state,
   The end opening of the port of the receptacle that forms the second piece is concealed by the first piece arranged toward the top and mounted on and assembled in the second piece, and
   The pocket is placed by its bottom on the bottom of the container;
With an opening for introducing the product from the receptacle being open, a product is gradually introduced into the receptacle, and simultaneously the pocket is allowed to be deployed upward and to be expanded in volume by the container until the desired quantity of product has been introduced into the receptacle;
The first piece is disassembled from the second piece, and the end opening of the second piece is thus opened;
With this end opening of the second piece thus being opened, a product and/or a means of treatment and/or for measuring the contents of the pocket is introduced through this end opening into the pocket, and once this last stage has ended,
The first piece is mounted or assembled on and in the second piece.

In one embodiment corresponding to the case where the receptacle comprises—in an integrated way—treatment means comprising mixing means arranged in the interior of the pocket by being adjacent to its bottom, the process is such that:
   The end opening of the port of the receptacle that forms the second piece is concealed by the first piece and with an opening for introducing the product of the receptacle being open, the desired quantity of a product is introduced into the receptacle;
   The first piece is disassembled from the second piece, and the end opening of the second piece is thus opened;
   With this end opening of the second piece thus being open, a desired quantity of a product is introduced by this end opening into the pocket;
   The mixing means are used;
   The first piece is mounted or assembled on and in the second piece;
   And the implementation of the mixing means is continued.

According to a sixth aspect, the object of the invention is a process for using a unit in the case where the third piece is an open pocket opposite its annular end part for the purpose of inserting a product P into the receptacle via the third piece (open pocket), in which:
   A receptacle for storage or treatment comprising a pocket and a third piece (open pocket) connected in a rigid and airtight manner to the first piece is used;
   A closing piece is combined with the end part of the third piece (open pocket), and it is maneuvered to close the passage that is formed by the annular end part;
   With the third piece (open pocket) being open opposite its thus closed annular end part, the desired quantity of the product P is introduced by this part into this third piece (pocket);
   The opening of the third piece (pocket) opposite its closed annular end part is closed;
   The first piece is mounted or assembled on and in the second piece, with no communication then existing between the pocket of the receptacle for storage or treatment and the third piece (pocket);
   When desired, the closing piece is maneuvered to open the passage that is formed by the annular end part, with communication then being established between the pocket of the receptacle for storage or treatment and the third piece (pocket);
   The product that is inserted into the third piece (pocket) is sent into the pocket of the receptacle for storage or treatment.

According to a sixth aspect, the object of the invention is a process for using a unit in the case where the third piece is a closed pocket opposite its annular end part for the purpose of inserting a product P into the receptacle via the third piece (closed pocket), in which:
   A receptacle for storage or treatment comprising a pocket and a third piece (closed pocket) connected in a rigid and airtight manner to the first piece is used;
   With the third piece (pocket) being open at its annular end part, the desired quantity of the product P is introduced by this part into this third piece (pocket);
   A closing piece is combined with the end part of the third piece (pocket), and it is maneuvered for closing the passage that is formed by the annular end part;
   The first piece is mounted or assembled on and in the second piece, with no communication then existing between the pocket of the receptacle for storage or treatment and the third piece (pocket) containing the product P;
   When desired, the closing piece is maneuvered to open the passage formed by the annular end part, with communication then being established between the pocket of the receptacle for storage or treatment and the third piece (pocket);
   The product P that is inserted into the third piece (pocket) is sent into the pocket of the receptacle for storage or treatment.

BRIEF DESCRIPTION OF THE DRAWINGS

Several embodiments of the invention are now described using drawings, in which:

FIG. 1 is an axial cutaway view of a possible embodiment of the first piece, in the case of a continuous and solid transverse wall with a sealing bead, with the first piece being at rest, inactive and disassembled from the second piece;

FIG. 2 is an axial cutaway view of the embodiment of the first piece of FIG. 1, mounted on, or assembled in, the second piece in the form of a port that is part of a receptacle that also comprises a pocket that is shown symbolically and partially, with the skirt of the first active piece coming into contact with holding tightening on the exterior surface of the collar of the second piece;

FIG. 3 is an axial cutaway view of another possible embodiment of the first piece, in the case of a continuous and solid transverse wall without a sealing bead, with the first piece being at rest, inactive and disassembled from the second piece;

FIG. 4 is an axial cutaway view of the embodiment of the first piece of FIG. 3, mounted on, or assembled in, the second piece in the form of a port that is part of a receptacle that also comprises a pocket shown symbolically and partially, with the skirt of the first active piece coming into contact with holding tightening on the exterior surface of the collar of the second piece;

FIG. 5 is an axial cutaway view of a possible embodiment of a first piece that is analogous to that of FIGS. 1 and 2, with the second piece being in tube form;

FIG. 6 is an axial cutaway view of a possible embodiment of a first piece that is analogous to that of FIGS. 3 and 4, with the second piece being in tube form;

FIG. 7, analogous to FIG. 1, is an axial cutaway view of another possible embodiment of the first piece, in the case of a transverse wall with a sealing bead and comprising several passage openings delimited by several tubular pieces, in this case one extending toward the inside and several extending toward the outside, with the first piece being at rest, inactive and disassembled from the second piece;

FIG. 8, analogous to FIG. 2, is an axial cutaway view of the embodiment of the first piece of FIG. 7, mounted on, or assembled in, the second piece in the form of a port that is part of a receptacle that also comprises a pocket shown symbolically and partially, with the skirt of the first active piece coming into contact with holding tightening on the exterior surface of the collar of the second piece;

FIG. 9 is an axial cutaway view of another possible embodiment of a first piece, in the case of a transverse wall without a sealing bead and comprising several passage openings delimited by several tubular pieces, in this case one extending toward the exterior and several extending toward the exterior; with the first piece being at rest, inactive and disassembled from the second piece;

FIG. 10 is an axial cutaway view of the embodiment of the first piece of FIG. 9, mounted on, or assembled in, the second piece in the form of a port that is part of a receptacle that also comprises a pocket shown symbolically and partially, with the skirt of the first active piece coming into contact with holding tightening on the exterior surface of the collar of the second piece;

FIG. 11 is a view that is analogous to FIG. 8 (first piece with a sealing bead), in the case of a second piece in tube form, with the skirt of the first active piece coming into contact with holding tightening on the exterior surface of the collar of the second piece;

FIG. 12 is a view that is analogous to FIG. 10 (first piece without a sealing bead), in the case of a second piece in tube form, with the skirt of the first active piece coming into contact with holding tightening on the exterior surface of the collar of the second piece;

FIGS. 14A and 14B are two explanatory diagrams, in axial cutaway and on a larger scale, illustrating the first piece according to the variant embodiment with a sealing bead according to FIGS. 1, 2, 5, 7, 8 and 11, respectively before and after mounting on, or assembly in, the second piece; whereby the first piece is at rest, inactive and disassembled from the second piece in FIG. 14A and the skirt of the first active piece, coming into contact with holding tightening on the exterior surface of the collar of the second piece in FIG. 14B;

FIGS. 15A and 15B are two explanatory diagrams, in axial cutaway and on a larger scale, illustrating the first piece according to the variant embodiment without a sealing bead according to FIGS. 3, 4, 6, 9, 10, and 12, respectively before and after mounting on, or assembly in, the second piece, whereby the first piece is at rest, inactive and disassembled from the second piece in FIG. 15A, and with the skirt of the first active piece coming into contact with holding tightening on the exterior surface of the collar of the second piece in FIG. 15B;

FIG. 16 is a diagrammatic view in axial cutaway of a unit that comprises a first piece according to the variant embodiment with a sealing bead according to FIGS. 1, 2, 5, 7, 8 and 11, and a second piece that is a port that is part of a receptacle that also comprises a pocket that is placed in an external rigid container, whereby the first piece is disassembled from the second piece but opposite the opening of the collar of the second piece;

FIG. 17 is a series of nine successive diagrams, 17A to 17I, illustrating the successive stages of a mixing process that uses a first piece with a continuous and solid transverse wall;

FIGS. 18A and 18B are two half-views in axial cutaway of a unit that comprises a third piece that is made integral directly with the first piece whose transverse wall comprises an opening, with the third piece being in the form of an open pocket (half-view from the left or FIG. 18A) or in the form of a closed pocket (half-view from the right or FIG. 18B), whereby the first piece is shown here in a purely symbolic way;

FIGS. 19A and 19B are two half-views in axial cutaway of a unit that comprises a third piece that is made integral directly with the first piece whose transverse wall comprises an opening, with the third piece being in the form of an open tube (half-view from the left or FIG. 19A) or in the form of a closed tube (half-view from the right or FIG. 19B), whereby the first piece is shown here in a purely symbolic way;

FIGS. 20A and 20B are two half-views that are analogous to FIGS. 18A and 18B, with the unit comprising a third piece that is made integral indirectly with the first piece whose transverse wall comprises an opening by means of a tubular piece, with the third piece being in the form of an open pocket (half-view from the left or FIG. 20A) or in the form of a closed pocket (half-view from the right or FIG. 20B), with the first piece being shown here in a purely symbolic way;

FIGS. 21A and 21B are two half-views in axial cutaway of a unit that comprises a third piece that is made integral indirectly with the first piece whose transverse wall comprises an opening, by means of a tubular piece, whereby the third piece is in the form of an open tube (half-view from the left or FIG. 21A) or in the form of a closed tube (half-view from the right or FIG. 21B), whereby the first piece is shown here in a purely symbolic way;

FIGS. 22A, 22B, 23A and 23B are analogous to the respective FIGS. 20A, 20B, 21A and 21B, with the tubular piece having another embodiment, and the first piece here being shown in a purely symbolic way;

FIGS. 24A and 24B are two axial cutaway views that illustrate two successive stages of a process for the filling with a product of a unit that comprises a third piece in the form of an axially open pocket, indirectly made integral with the first piece whose transverse wall comprises an opening by means of a tubular piece such as the one shown in FIGS. 20A and 20B, with the first piece being shown here in a purely symbolic way;

DETAILED DESCRIPTION OF THE PREFERRED EMBODIMENTS

Figure 13:
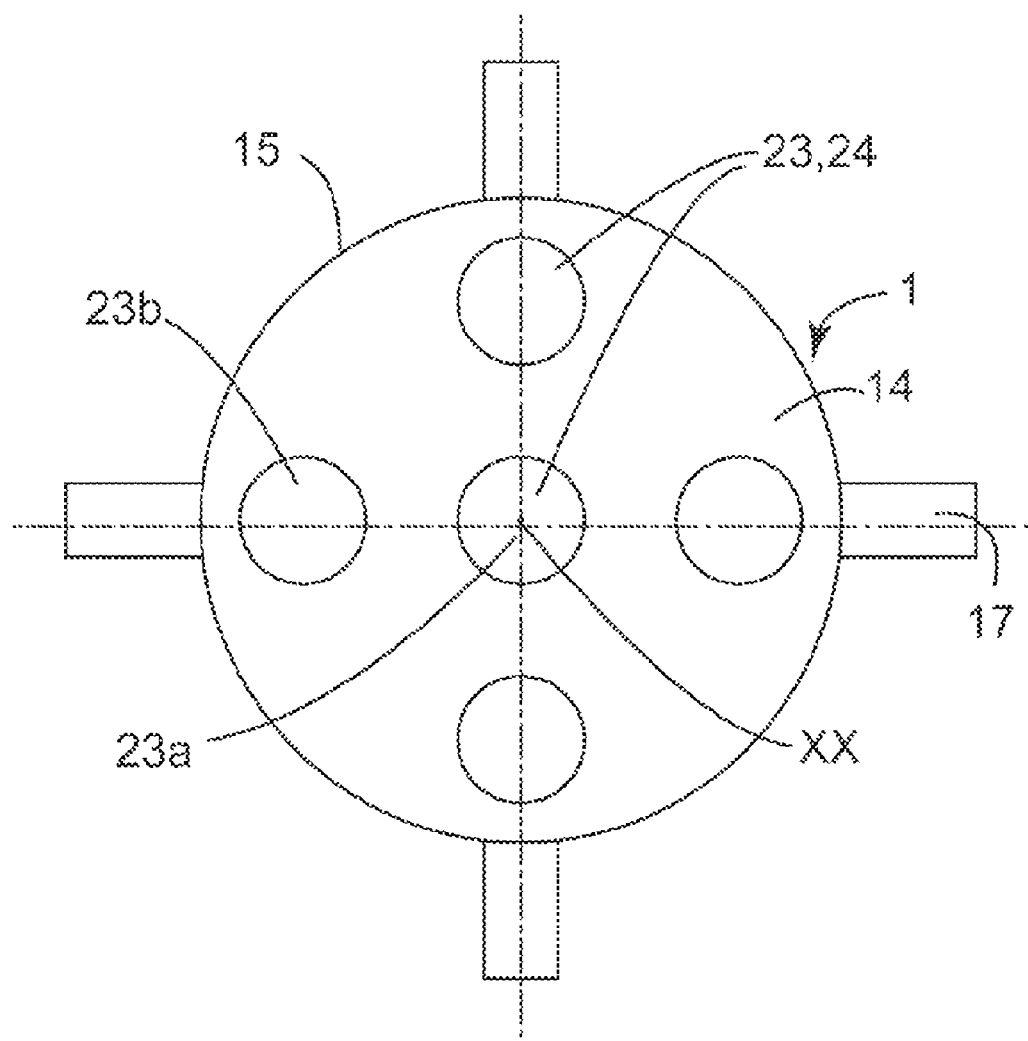
FIG. 13 is a top elevation view of the first piece according to an embodiment of the type that is shown in FIGS. 7 and 9, with the first piece being at rest, inactive and disassembled from the second piece.

Reference is now made to FIGS. 1 and 2 that show a first piece 1 for mounting or assembly and, in this case, sealing, mounted or assembled in a stationary, removable and airtight manner on a second rigid, hollow piece 2 for storage or for passage, with a quick installation and removal.

The two pieces 1 and 2, the unit 1+2 formed by the two mounted and assembled pieces, and the associated processes and devices are specially designed for the biopharmaceutical field. This means that they are designed to meet all of the requirements and to satisfy all of the constraints that are specific to this technical field.

Now, more specially, the second piece 2 is described.

In the embodiment that is being considered here, the second piece 2 is a port 2a that has an end opening 3 and is part of a receptacle 4 for storage or treatment (FIG. 16), also comprising a pocket 5 that has a bottom 6 and, opposite the bottom 6, an opening 7 that is designed to be combined rigidly, or is combined rigidly, with the second piece 2 opposite its end opening 3.

The second piece 2 has an XX axis and comprises an annular collar 8 that delimits the end opening 3.

The second piece 2 is rigid with a degree such that it is able to absorb the tightening forces exerted on it by the first piece 1, as described below.

The end opening 3 can have a more or less large diameter or, on the contrary, a small diameter based on the applications. In the case of large-capacity receptacles 4, for example 3,000 liters, intended for mixing, it may be important that the end opening 3 have a large enough diameter, for example that can reach on the order of 50 centimeters. The piece 1 is adapted to this case depicted, just as to that of very small diameters.

From the side of the opening 3, the collar 8 forms a bulge 9 that is directed radially toward the exterior.

The exterior surface 10 of the collar 8 comprises a cylindrical form part 10a of larger diameter toward the bulge 9 and the opening 3, a cylindrical form part 10b of smaller diameter separated from the bulge 9 and the opening 3, and an intermediate part 10c for connection of a tapered shape whose large base is adjacent to the part 10a with a larger diameter and whose small base is adjacent to the part 10b of smaller diameter. In this case, the tilt of the intermediate part 10c with a tapered shape is on the order of 45° on the XX axis.

The end edge 11 of the bulge 9 of the collar 8 comprises, in the embodiment being considered, a second peripheral and annular sealing means 12 that has, in a transverse straight cross-section, a form of a rounded groove, for example at least essentially semi-circular.

Opposite the bulge 9 and the opening 3, in the axial direction, the second piece 2 comprises, being an integral part, an annular plate 13 that is arranged radially toward the exterior, rigidly attached to the pocket 5, in the vicinity of its opening 7.

The second piece 2 has a cylindrical shape of an XX axis, with a transverse cross-section that is circular or of another shape. It is made of plastic material or of any other equivalent material that is compatible with use in the biopharmaceutical field.

The first piece 1 is now described more specially in the embodiment being considered here.

The first piece 1 has an XX axis that, when the two pieces 1 and 2 are mounted on one another or assembled in one another, is merged with the XX axis of the second pipe 2, whereby the two pieces 1 and 2 are mounted and assembled coaxially.

The first piece 1 comprises a transverse wall 14, having an exterior surface and an interior surface 14a. In the embodiment being considered, the transverse wall 14 is continuous and solid, with the first piece 1 having a sealing function once mounted on, and assembled in, the second piece 2.

As is readily visible in the figures, the interior surface 14a of the transverse wall 14 is formed by an essentially flat central zone and a marginal zone positioned on the periphery of the central zone so as to form a mating part of the end edge 11 of the collar 3 that can be applied against it and to participate in the sealing between the two pieces 1, 2.

According to this embodiment, there is an essentially flat continuity between the central and marginal zones of the transverse wall 14. More particularly, these central and marginal zones extend essentially along the same plane.

Furthermore, no part of the transverse wall 14 comes on the internal surface of the collar 8.

Thus, when the first piece 1, mounted in a stationary and rigid manner on the second piece 2, is to be removed, it is possible to stretch, by elasticity, the transverse wall 14 of this first piece 1 without any portion abutting against the interior surface of the collar 8.

In this case depicted, the central zone of the transverse wall 14 can be stretched transversely and can slide over the end edge 11 of the collar 8 until the first piece 1 is in an intermediate state where it is more strongly stretched transversely and where it may be totally removed.

In the same way, when the first piece 1 is in an inactive state and it is to be mounted in a stationary and rigid manner on the second piece 2, it is possible to stretch transversely, by elasticity, the transverse wall 14 of this first piece 1 and to position the first piece 1 that is heavily stretched on the end edge 11 of the collar 8. Using the essentially flat continuity that links the central and marginal zones of the transverse wall 14, the latter can rest on the end edge 11 of the collar 8 and slide over it without any portion disturbing this sliding. The first piece then returns to an active state for which the marginal zone of the transverse wall 14 forms a part that is mated to this end edge 11.

The first piece 1 also comprises a peripheral annular wall that forms a skirt 15, having an exterior surface and an interior surface 15a.

The transverse wall 14 and the skirt 15 are in one piece, for example manufactured as a unit.

As indicated, the transverse wall 14 has as its function, when the two pieces 1 and 2 are mounted and assembled, to come into the opening 3 so as to conceal it.

When the two pieces 1 and 2 are mounted and assembled, the skirt 15 has as its function to come, by its interior surface 15a, into contact with the exterior surface 10 of the collar 8, with a holding tightening, absorbed by the adequate rigidity of the second piece 2. The parts of the surfaces 10, 10a, 10b and 10c, on the one hand, and 15a, on the other hand, in contact with one another with holding tightening, are described as "mated."

The two pieces 1, 2 have complementary shapes that allow their mounting and assembly. In particular, the mating interior surface 15a of the skirt has a shape that is complementary to the mating parts of the surfaces 10, 10a, 10b and 10c.

The interior surface 15a of the skirt 15 consequently comprises a part of cylindrical shape 39a of larger diameter and adjacent to the transverse wall 14, a part of cylindrical shape 39b of smaller diameter that is axially separated from the transverse wall 14, and an intermediate connecting part 39c of tapered shape whose large base is adjacent to the part 39a of larger diameter and whose small base is adjacent to the part 39b of smaller diameter. The tilt of the intermediate part 39c of tapered shape is on the order of 45° on the XX axis.

Once the two pieces 1 and 2 are mounted and assembled, the part 39a of the skirt comes into contact with holding tightening on the part 10a of the exterior surface 10 of the collar 8, whereby these two parts 39a and 10a are mated, while the part 39b comes into holding tightening contact and is mated with the part 10b, and the part 39c comes into contact with holding tightening and is mated to the part 10c.

The first piece 1 is made of a material that offers an inherent sealing, apart from the fact that the first piece 1 is mounted and assembled on the second piece 2 also with sealing between them. Sealing is defined here as that required for a biopharmaceutical application that relates to air, water and in particular a barrier to bacteria.

The first piece 1 is made of a material that has characteristics of flexibility and elastic deformability, respectively of a value and in a range that are suitable for the requirements resulting from the application, the functions performed, and the desired results.

More specifically, the first piece 1 first has a high degree of flexibility, itself making it possible, under an exterior action, such as a manual action exerted by an operator that uses the first piece, to be curved or bent with high amplitude, without being degraded. The first piece 1 is therefore not rigid, although in the inactive state, in the absence of external action, it has a specified natural shape. The first piece 1 therefore easily lends itself to manipulation including a certain deformation.

In contrast, and in combination, the first piece 1 also has a capacity for stretching in an elastic deformation range. Thus, starting from its inactive state in the absence of external action, and since sufficient traction, such as a manual action exerted by an operator using the first piece, is applied to the first piece 1, the latter is stretched. Once the traction has stopped, the first piece 1 returns to its original shape and size.

These are these properties, combined with the shape and size of the first piece 1, in connection with the second piece 2, which ensure that the first piece 1 meets the needs resulting from the application, performed functions, and desired results.

The first piece 1 can be found in three typical states or situations:

An at-rest state, where the first piece 1 is inactive, disassembled from the second piece 2 and not subjected to external stresses of deformation or stretching; the first piece then assumes its natural shape and size, as shown in FIGS. 1 and 14A;

An active state, where the first piece 1 is mounted on, or assembled in, the second piece 2, with the skirt 15 of the first piece 1 coming into contact with holding tightening on the exterior surface 10 of the collar 8 of the second piece 2, whereby the first piece is slightly stretched transversely in its elastic deformation range, as shown in FIGS. 2 and 14B;

An intermediate state, where the first piece 1 is more heavily stretched transversely so as to be expanded enough to be able to be slipped onto (installed on) or slipped off of (removed from) the second piece 2 that comprises the bulge 9, with the first piece remaining in its elastic deformation range; in this intermediate state, the first piece 1 can be more or less curved or bent, if necessary with a certain amplitude, in such a way as to promote this installation or this removal.

The passage from the active state, where the first piece 1 is mounted on the second piece 2, to the intermediate state, where the first piece 1 is more heavily stretched transversely so as to be expanded enough to be able to be slipped on or slipped off, is facilitated by the essentially flat continuity of the central and marginal zones of the transverse wall 14.

Actually, this continuity makes it possible to ensure or to facilitate the sliding of the central zone, on the one hand, and the marginal zone, on the other hand, over the end edge 11 of the collar 8 when the transverse wall 14—which is combined with or is about to be combined with the collar 8 of the second piece 2—passes from an active state to an intermediate state.

The mating interior surface 15a of the skirt 15, in the inactive state at rest, has an interior diameter that is slightly smaller than the exterior surface of the mating exterior surface 10 of the collar 8 (see FIGS. 14A and 14B).

On its interior surface 14a, the transverse wall 14 comprises a first sealing means 16 that is peripheral and annular, projecting, located close to the skirt 15 and having a rounded bead shape, for example at least essentially semi-circular, in a transverse straight cross-section.

The two sealing means 12 and 16 are mated and designed to be combined with one another and thus to work with one another when the two pieces 1 and 2 are mounted or assembled.

The first piece 1 consequently has relative dimensions in relation to the second piece 2, as well as elastic characteristics that are selected and chosen because of the functions that have to be performed and the performances that have to be achieved.

More specifically, starting from the rest state of the first piece 1 (FIG. 14A), the first piece 1 can be expanded transversely while remaining in the range of elastic deformation, up to the intermediate state such that the interior surface 15a of the skirt, more specifically the part 39c, has a diameter that is at least slightly larger than the maximum exterior diameter of the collar 8 toward the opening 3, at the site of the bulge 9.

Thus, by an external stress of adequate expansion, the skirt 15 of the first piece 1 can be expanded and slipped on, then thus installed, mounted or assembled on and in the collar 8 of the second piece 2.

By an adequate external stress, it can then conversely be removed and disassembled from the collar 8.

It should be noted that the installation of the first piece 1 on the second piece 2 is easy, quick and reliable. The same is true for the removal or disassembly of the first piece 1 from the second piece 2. The mounting or assembly is therefore also removable and, taking the preceding into account, well suited to the case where the process that is used requires several operations for opening and closing, in particular for relatively limited periods.

Once the first piece 1 has been mounted or assembled on the second piece 2, as it was disclosed, and in the absence of external expansion stress, the skirt 15 is arranged on and around the collar 8 with their mating surfaces 15a and 10 in contact with holding tightening, while the sealing bead 16 of the transverse wall 14 is combined with sealing by being housed in the sealing groove 12 that is mated with the collar 8 (FIG. 14B).

In this situation, the first piece 1 is found in its elastic deformation range and the skirt 15 exerts on the collar 8 a tightening force that can ensure a stationary and rigid, as well as airtight, holding, with the second piece 2 preventing the inadvertent disassembly of the two pieces 1, 2 in the absence of an adequate external stress.

In the application being considered, namely the biopharmaceutical field, such a first piece 1 is able to ensure a mounting or assembly on the second piece 2 for the purposes of sealing the end opening 3, with the holding of this sealing in the absence of an adequate external stress. It is understood that in this application, the receptacle 4 that comprises the pocket 5 is designed to accommodate a fluid at atmospheric pressure or close to atmospheric pressure, and at a temperature that is positive between approximately 0° C. and on the order of 40° C. between the ambient temperature and on the order of 40° C. This receptacle 4 is also designed to remain stable, with the pieces 1 and 2 being arranged upward. Consequently, the fluid that is contained in the receptacle 4 cannot itself exert on the first piece 1 an external stress that would be adequate for entraining its disassembly.

In one possible embodiment, not excluding others, the first piece 1 also comprises one or more peripheral tabs 17 that are arranged radially toward the outside, adjacent to the free edge 18 of the skirt 15, adjacent to the part 39b, and integral with it. This or these tabs 17 are such that they can facilitate the expansion of the skirt 15 for the purpose of its mounting or assembly.

To obtain the performances previously indicated, the first piece 1 is made of silicone or an equivalent material, particularly well suited to the biopharmaceutical field, in particular keeping its integrity during sterilization by γ radiation, meeting the approval of the health authorities and being able to be used in a white room.

For example, in one embodiment, a silicone of Shore hardness 55 ShA is used.

The first piece 1 is made of a material that has an elastic stretching capacity that is based on the size difference of the mounting piece 1 between its inactive state and its intermediate state, in such a way that both in the intermediate state and in the active state, the mounting piece 1 has an elastic deformation relative to its inactive state where it does not have elastic deformation, and that in the active state, its elastic deformation is such that it elastically tightens the collar 8 of the second piece 2 to ensure holding with sealing.

Preferably, the material that constitutes the first piece 1 is antistatic so as not to hamper the implementation of the unit comprising the two pieces 1, 2 in the case where they are in contact with materials in powder form.

In contrast, the constituent materials of the first piece 1 and the second piece 2 as well as the state of surfaces of the mating faces of the collar 8 and the skirt 15 are such—or are selected in such a manner—that their reciprocal contact is made with a high friction that contributes to the holding of the mounting or assembly of the two pieces 1 and 2 once implemented.

As a result of its constitution, such a first piece 1 can be relatively inexpensive to manufacture, which offers a possibility of single use (per se or for a process overall).

In one possible embodiment, the transverse wall 14 has a thickness on the order of one millimeter, while the skirt 15 has a thickness that can range from on the order of three millimeters facing the part 39a to on the order of four millimeters facing the part 39b.

Actually, it is essential that the elastic deformation of the first piece 1 that is mounted or assembled on the second piece 2 relates more to the transverse wall 14 than to the skirt 15 that optimally is to be applied on the mating part of the exterior surface 10 with tightening.

To assemble such a first piece 1 in and on such a second piece 2, the procedure is as follows, as well as that which results from FIGS. 14A and 14B.

The starting point is a situation (FIG. 14A) where use is made of a first piece 1 at rest, not subjected to an external stress, whose shape and dimensions are adapted, as indicated above, to those of a second piece 2 to be sealed, which is also available.

By an adequate, in particular manual, external stress, at least on the skirt 15 of the first piece 1, the latter is expanded by remaining in the range of elastic deformation, up to a diameter that is at least slightly larger than the maximum exterior diameter of the collar 8 toward the opening 3, at the site of the bulge 9.

Furthermore, the first piece 1 is positioned opposite and in the XX axis of the second piece 2, and, with the skirt 15 of the first piece 1 having thus been expanded, it is then possible to slip it onto the collar 8 of the second piece 2 until the bead 16 is housed in the groove 12, in such a way that the two pieces 1 and 2 are perfectly positioned axially.

In this position, the first piece 1—and in particular the skirt 15—is no longer stressed in the direction of its expansion until by elastic deformation, the skirt 15 goes in the direction of its constriction until its interior mating surface 15a comes into contact with elastic tightening on the mating exterior surface 10 of the collar 8 (FIG. 14B).

In this situation, as already indicated, the skirt 15 exerts a tightening force on the collar 8, in particular by the mating parts 39a and 39b of its interior surface 15a, and said tightening force can ensure a stationary and rigid holding on the second piece 2, in particular the mating parts 10a and 10b, with this holding preventing the inadvertent disassembly of the two pieces 1, 2 in the absence of an adequate external stress.

Relative to the sealing between the two pieces 1 and 2, it is first ensured at the end edge 11 and the mating part of the interior surface 14a of the wall 14, second at the sealing means 12 and 16, and third at the mating parts 10a and 39a. Because of the tilted mating parts 10c and 39c, the mating part of the interior surface 14a of the wall 14 is applied against the end edge 11 of the second piece 2.

For the disassembly of the first piece 1 from the second piece 2, the procedure is as follows.

By an adequate, in particular manual, external stress, at least on the skirt 15 of the first piece 1, the latter is expanded to a diameter that is at least slightly larger than the maximum exterior diameter of the collar 8 toward the opening 3, at the site of the bulge 9.

Then, the first piece 1 is slipped off of the second piece 2 until the two pieces 1, 2 are disassembled.

FIGS. 3 and 4 show another embodiment, analogous to the preceding one, except that the first piece 1 is lacking a bead forming the first sealing means provided in the preceding embodiment.

FIGS. 15A and 15B, analogous to FIGS. 14A and 14B, illustrate the mounting or assembly in this corresponding embodiment.

FIG. 5 shows another embodiment, identical to FIGS. 1 and 2, relative to the first piece 1, while the second piece 2 is not a port as above but a tube 2b whose diameter can be more or less small, or, in contrast, large. Such a tube 2b can have an overall rigidity that can absorb the tightening forces exerted by the first piece 1. If necessary, the rigidity of the tube 2b is such that the latter can be bent with force, if necessary, by an adequate external stress.

Such a tube 2b also comprises a collar 8 that is formed by its end part, whereby this collar 8 has the same structure and the same function as for the port 2a.

FIG. 6 shows another embodiment, identical to FIGS. 3 and 4 relative to the first piece 1, while the second piece 2 is no longer a port, but a tube as in the case of FIG. 5.

Thus, the invention can be the object of numerous different applications.

The first piece 1 and the unit 1+2 that comprises the first piece 1 and the second piece 2 have a production cost that allows a single use. The mounting or assembly and the disassembly of the two pieces 1 and 2 is quick and reliable. It ensures a sealing that is comparable to that obtained today with the tri-clamps. The openings 3 and 7 can have a diameter that is between a centimeter or a fraction of a centimeter and about 50 centimeters, without the design of the pieces having to be completely distorted.

As for the "versatility," it can be illustrated with reference to the different variant embodiments already described and those that follow.

In the preceding embodiments, and as shown in FIG. 16, the second piece 2, in this case a port 2a, is part of a receptacle 4 that comprises a pocket 5 that is designed to rest with its bottom 6 in the bottom of a rigid exterior holding container 19 open toward the top. Such a pocket 5 comprises a flexible lateral wall 20, with gussets, that can be found in two end states, respectively flat-folded and deployed, and in any intermediate state, and that can be deformed for passing from one state to the next. This constructive arrangement makes it possible for the so-called 3D pocket 5 to have large dimensions and to have a large volume that can reach 3,000 liters.

In the embodiment shown, the receptacle 4 also comprises, integrated with the pocket 5, means 21 for treatment of its contents.

"Treatment" is defined as any action on a biopharmaceutical product or relative to this product and involving a contact with the product, whereby this product is found, of course, in the pocket 5.

In the particular embodiment that is described below, such a treatment is the mixing, with the means 21 being mixing means.

In other embodiments, the treatment is aeration, filtration, or measurement, whereby this list is not limiting.

In all of the cases, treatment means 21 adapted to the desired action are implemented.

For example, the means 21 comprise an interior active part, rigid overall and, as appropriate, deformable or not, such as a propeller in the case of mixing, an aerator in the case of aeration, a filter in the case of filtration, or a sensor in the case of measuring, whereby this list is in no way limiting.

In all cases, the treatment means 21 are arranged at least partly in the interior of the pocket 5 by being adjacent to its bottom 6. They are therefore located opposite the second piece 2 or port 2a.

With such an embodiment, the second piece 2 or port 2a can also constitute means for protecting treatment means 21 of which an active internal part is essentially arranged in the internal space of the second piece 2 or port 2a, when the pocket 5 is in the flat-folded state. The peripheral part of the internal space of the second piece 2 or port 2a then forms a chamber for protection of the pocket 5 and treatment means 21.

Such a unit 1+2 can be implemented as it is now described with reference to the nine diagrams of FIGS. 17A to 17I, together forming FIG. 17.

The starting point is a situation wherein a receptacle 4 that comprises a pocket 5 in the flat-folded state and a rigid container 19 are arranged.

In the embodiment shown, the pocket 5, at this stage of advancement of the process, is already equipped in the interior with the treatment means 21, here, for example, mixing means 21.

In this situation, the end opening 3 of the port 2a is concealed by the first piece 1 that is arranged toward the top and mounted on and assembled in the port 2a, as it was described above.

The pocket 5 is then placed by its bottom 6 on the bottom of the rigid container 19 (FIG. 17A).

FIG. 17B illustrates the rigid container 19 that contains the pocket 5, with the latter not being visible, because it is concealed by the vertical lateral walls of the container 19.

The following diagrams, FIGS. 17C to 17I, show only the pocket 5 on a larger scale. It is understood that this pocket 5 continues to be in the rigid container 19, not shown here so as not to conceal the pocket 5. In addition, the completely deployed pocket 5 is shown from the beginning of the process, for reasons of ease of reading the figures. It is to be understood, however, that the pocket 5 is deployed upward as it is filled.

The pocket 5 comprises one—or more—openings 22 for introducing product, located in particular at the site or in the vicinity of the bottom 6, accessible from the exterior of the container 19.

As shown in FIG. 17C, with the opening 22 being open, a fluid product, in this case liquid or more or less pasty, is gradually introduced into the pocket 5 of the receptacle 4, and simultaneously the pocket is allowed to deploy upward and to be expanded in volume by the container 19 that guides its lateral walls 20.

The introduction of product is continued until the desired quantity of this product has been introduced into the pocket 5.

Thus far, the first piece 1 and the port 2a were mounted or assembled, with the opening 3 being thereby concealed.

As shown in FIG. 17D, the first piece 1 is then disassembled from the port 2a, as it was described above, and thus the end opening 3 of the port 2a is opened.

As shown in the FIGS. 17E, 17F and 17G, with the end opening 3 thus being opened, a desired quantity of another product, in particular in powder form, is introduced via this end opening into the pocket 5. This introduction will be described below.

As shown in FIG. 17H, once this last introduction stage is ended, the previously disassembled first piece 1 (or an identical piece 1) is mounted or assembled again on and in the port 2a, as it was described above, and the opening 3 is concealed again.

The mixing means 21 are implemented, or they are continued to be implemented if the latter began during the introduction of the product in powder form.

In the embodiments of FIGS. 9 to 13, the transverse wall 14 comprises at least one passage opening 23. In this case, five openings 23 are provided, namely a central opening 23a and four lateral openings 23b that are located on two perpendicular axes. Other arrangements can be considered, since they comprise at least one opening 23.

In these embodiments, with the transverse wall 14 comprising at least one passage opening 23, the first piece 1 has a function of connection with communication, once mounted on, and assembled in, the second piece 2.

FIG. 9 shows an embodiment of the first piece 1 in which the latter is lacking the bead forming the sealing means as it was described above, with this first piece 1 being at rest without external stress.

FIG. 10 shows an embodiment in which such a first piece 1 is mounted or assembled on a port 2a, as it was described above.

FIG. 11 shows another embodiment in which a first piece 1 with a bead forming a sealing means as it was described above is mounted or assembled not on a port but on a tube.

FIG. 12 shows another embodiment in which a first piece 1 that is lacking a bead forming a sealing means as it was described above is mounted or assembled on such a tube.

With the embodiments of FIGS. 9 to 13, it is possible to make use of the first piece 1, of which the transverse wall 14 comprises an opening 23 for—once mounted on and assembled in—the second piece 2, to ensure a function of connection with communication between the second hollow piece 2 and a third hollow piece 27 that is at least partially flexible, designed for storage, for example, of the general type that forms a pocket.

Figure 27:
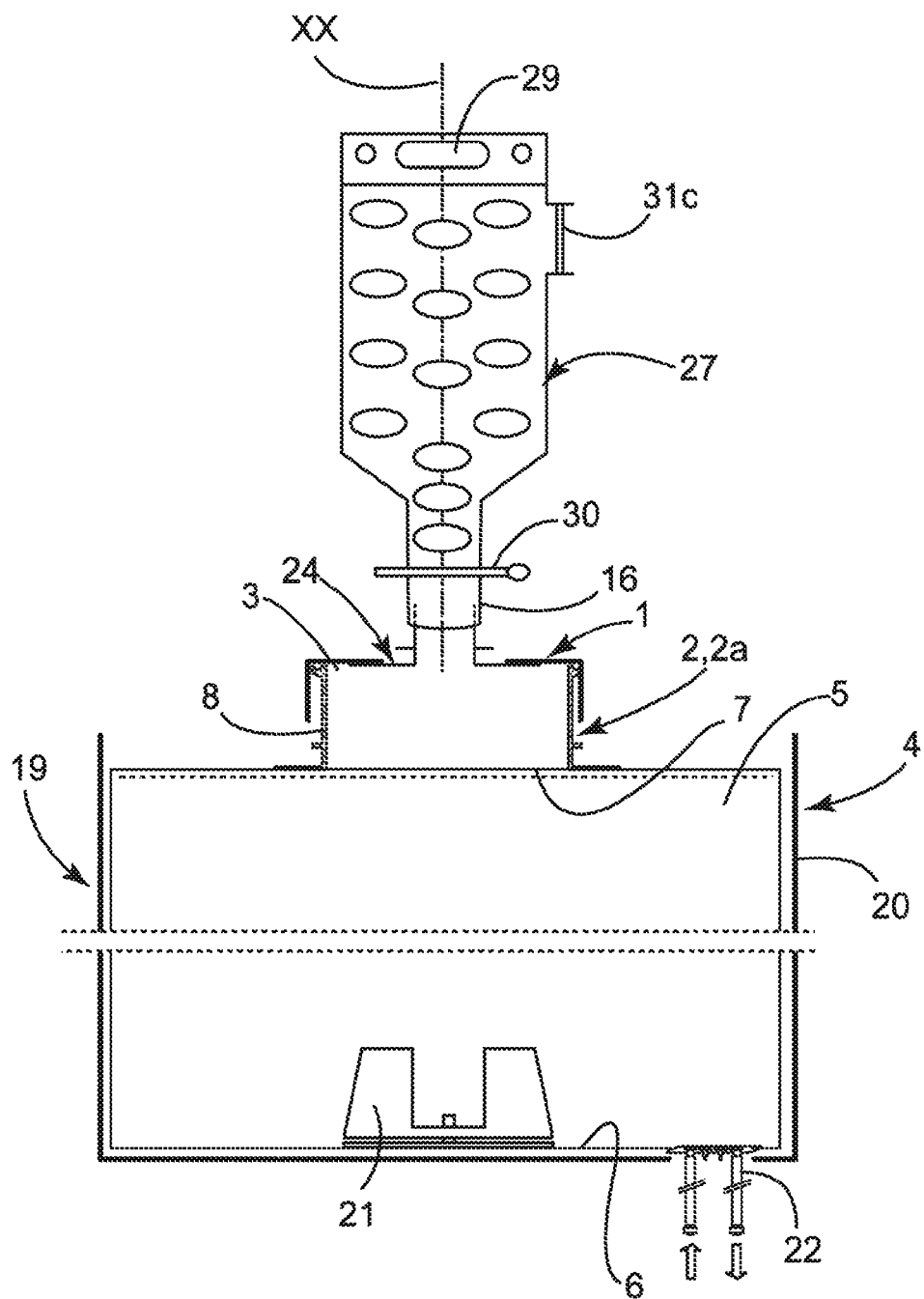
FIG. 27 is a schematic axial cutaway view of a unit that comprises a first piece according to the variant embodiment without a sealing bead according to FIGS. 3, 4, 6, 9, 10 and 12, 15A and 15B and a second piece that is a port that is part of a receptacle that also comprises a pocket that is placed in an external rigid container, with the first piece being mounted on and assembled in the second piece, the unit also comprising a third piece in the form of a pocket that is opened laterally and made integral indirectly with the first piece whose transverse wall comprises an opening by means of a tubular piece such as the one that is shown in FIGS. 25A and 25B.

As above, and as illustrated by FIG. 27, the piece 2 can be a port 2a that has an end opening 3, which is part of a receptacle 4 for storage or treatment, comprising in addition a pocket 5 that has a bottom 6 and opposite the bottom 6 an opening 7 that is designed to be combined rigidly, or is combined rigidly, with the second piece 2 opposite its end opening 3. As above, treatment means 21, such as, for example, mixing means 21, can be provided in the pocket 5.

Such a third piece 27 comprises an annular end part 26, on the side of which it is attached rigidly and in an airtight way, if necessary in a removable way, to the first piece 1.

In one embodiment, the third piece 27 is a particularly flexible pocket (FIGS. 18A, 18B, 20A, 20B, 22A, 22B, 24A, 24B, 25A, 25B, 28A [sic], 26B, 27).

This embodiment can be the object of different variant embodiments.

In a variant embodiment shown in FIGS. 18A, 20A, 22A, 24A and 24B, the third piece 27 originally comprises an axial opening 31a in the XX axis and opposite its annular end part 26.

In another variant embodiment shown in FIGS. 18B, 20B, 22B, the third piece 27 is permanently closed at its end part 31b, opposite its annular end part 26. With such an embodiment, it is possible to make use of the end part 31b that is permanently closed to provide there a means for hooking the third piece 27, such as an eyelet 29.

Figures 25A, 25B:
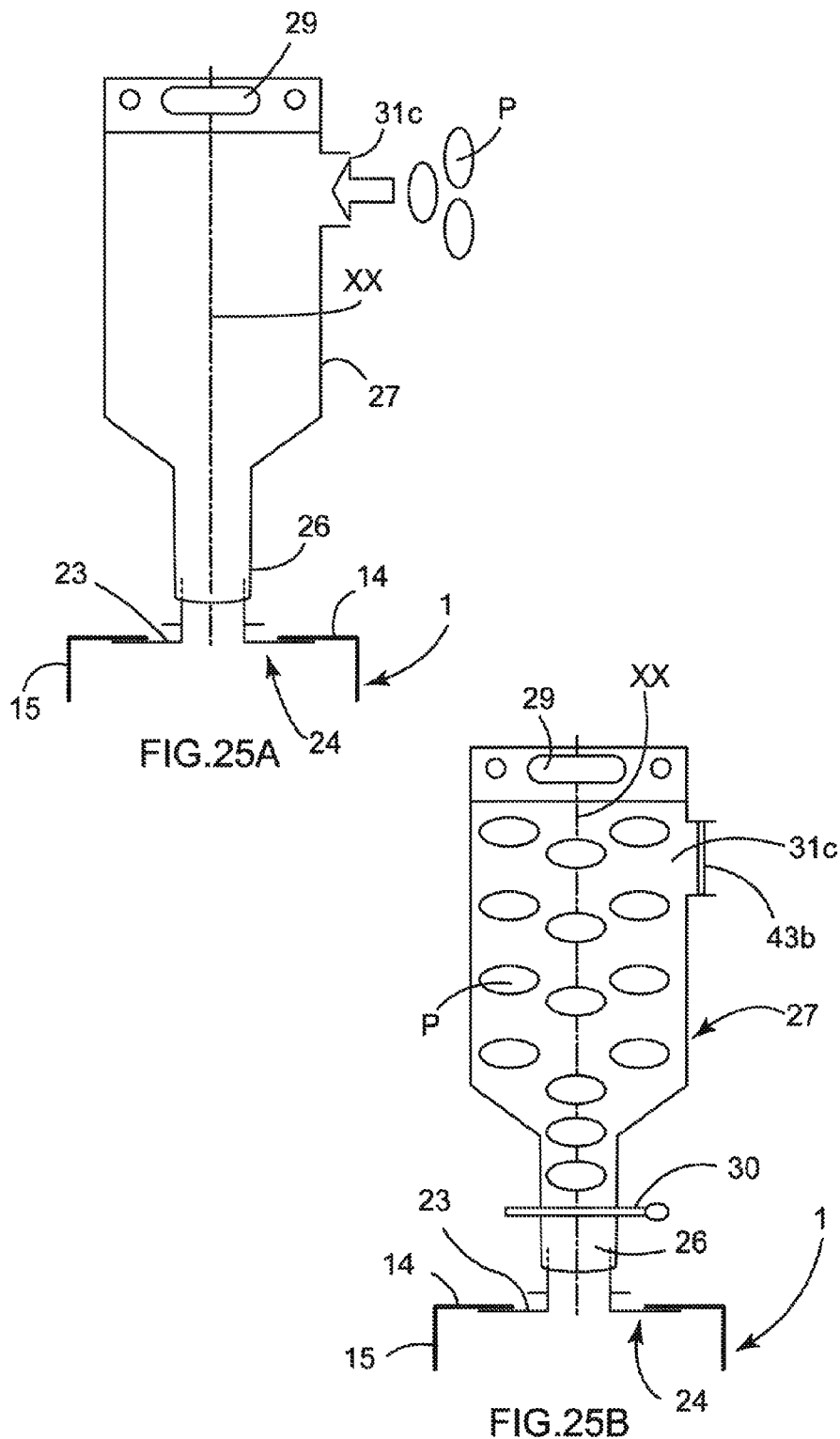
FIGS. 25A and 25B are two views that are analogous to FIGS. 24A and 24B, in the case of a third piece in the form of a pocket that is open laterally, with the first piece being shown here in a purely symbolic way.

In another variant embodiment shown in FIGS. 25A, 25B, the third piece 27 originally comprises, opposite its annular end part 26, a lateral opening 31c. With such an embodiment, with the end part 31b being permanently closed, it is also possible to arrange there a hooking means of the third piece 27, such as an eyelet 29.

In another embodiment, the third piece 27 is an open tube opposite its annular end part 26 and connected to a pocket or the like (FIGS. 19A, 19B, 21A, 21B, 23A, 23B).

In the embodiments of FIGS. 18A, 18B, 19A and 19B, the third piece 27 is directly combined fixedly and rigidly to the first piece 1, with the expanded terminal section of the annular end part 26 being rigidly attached, for example by welding, to the part 34 of the transverse wall 14 forming the edge of the opening 23.

In the embodiments of FIGS. 20A, 20B, 21A, 21B, 22A, 22B, 23A, 23B, 24A, 24B, 25A, 25B, 26A, 26B and 27, the third piece 27 is indirectly combined fixedly and rigidly to the first piece 1 by means of a tubular piece 24. Actually, the tubular piece 24 is combined fixedly and rigidly, on the one hand, to the first piece 1, on the other hand to the third piece 27 by being placed between them and by ensuring an airtight passage between them. With such an arrangement, the first piece 1 that is provided with the tubular piece 24 ensures in combination a function of connection and rigid attachment with the third piece 27 and a function of passage or transfer, in particular of a product and/or a means for treatment and/or measurement, with the end opening 3 of the second piece 2 actually remaining open.

Such a tubular piece 24 delimits the opening 23 and forms a rigid unit extending toward the exterior and/or the interior of the latter with the first piece 1. For example, the tubular piece 24 combined with the central opening 23a extends toward the exterior and the interior, while the tubular pieces 24 combined with the lateral openings 23 extend only toward the exterior. Subsequently, the focus will be more specially on the tubular pieces 24 that extend only toward the exterior or to the exterior part of the tubular pieces 24 that extend toward the exterior and the interior. Such a tubular piece 24 or such an exterior part of the tubular piece 24 acts as a fluid connection between the first piece 1 and the third piece 27.

According to the embodiments, the tubular connecting piece 24 is rigid, in particular more rigid than the first piece 1 and the third piece 27, or, in contrast, the tubular connecting piece 24 has a certain deformation capacity.

So that the tubular connecting piece 24 can form a stationary, rigid and airtight unit with the first piece 1, it is provided, for example, to supply it at one of its ends, in this case at the end adjacent to the first piece 1, with a collar 32, directed radially toward the exterior.

This collar 32 can be attached in a rigid and airtight way by gluing, welding, or the like, to the part 34 of the transverse wall 14 that forms the edge of the opening 23.

The tubular connecting piece 24 is combined in a stationary, rigid and airtight way to the third piece 27. For this purpose, the tubular wall 40 of the tubular connecting piece located on the side opposite to the collar 32 can be attached in a rigid and airtight way—by gluing, welding, or the like—to the annular end part 26 of the third piece 27, with the end-of-travel locking of the mounting of the third piece 27 on the tubular connecting piece 24 being ensured, provided that it is necessary, by the locking of the free end edge of the annular end part 26 on the collar 32 or the adjacent wall 14.

In the embodiment of FIGS. 20A, 20B, 21A, 21B, 22A, 22B, 23A, 23B, 24A, 24B, 25A, 25B, 26A, 26B and 27, the tubular connecting piece 24 comprises, forming a rigid unit with it, a transverse collar 25, adjacent to the tubular wall 40 toward the collar 32, directly radially toward the exterior, which may or may not be continuous. When the third piece 27 is attached to the first piece 1, the collar 25 is located on the exterior of the transverse wall 14, in particular in the vicinity of the latter.

Figure 26A:
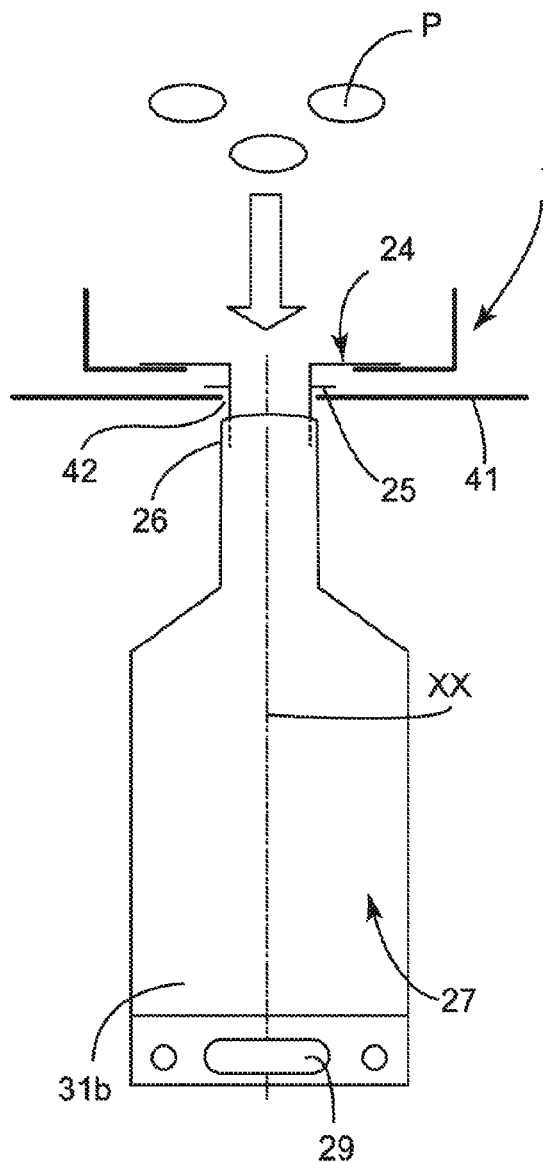
FIGS. 26A and 26B are two axial cutaway views that illustrate two successive stages of a process for the filling with a product of a unit that comprises a third piece in the form of a closed pocket, made integral indirectly with the first piece whose transverse wall comprises an opening by means of a tubular piece such as the one shown in FIGS. 20A and 20B, with the first piece being shown here in a purely symbolic way.

This transverse collar 25 is able to constitute a means for suspension of the third piece 27, working with a support wall 41 that is provided with a hole 42. In such a case, the third piece 27 is arranged with its annular end part 26 directed upward, in such a way that the transverse collar 25 rests on the upper surface of the support wall 41 in the vicinity of the hole 42, while the third piece 27 is suspended below the support wall 41 (FIG. 26A).

Optionally, the transverse collar 25 is able to constitute an end-of-travel locking for the free end edge of the annular end part 26.

In the embodiment of FIGS. 22A, 22B, 23A, 23B, the tubular piece 24 comprises, toward the exterior of the tubular wall 40, an exterior cylindrical wall 28, providing with the tubular wall 24 an annular cylindrical housing 28a that can accommodate the annular end part 26.

In the embodiment of FIGS. 24A, 24B, 25B, 26B and 27, there is also provided a removable closing piece 30, such as a clamp, designed to be combined with the flexible annular end part 26 of the third piece 27 with the function of closing or opening the passage that is formed by the latter, so as, respectively, to prevent, or on the contrary to allow, the passage of the contents of the third piece 27 into the pocket that is part of the second piece 2.

If necessary, the closing piece 30 is able to be combined also with the flexible tubular piece 24, with the function of opening or closing the passage that is formed by the latter.

Reference is now made more specially to FIGS. 24A and 24B, and the process for using a unit comprising—in addition to the pieces 1 and 2—a third piece 27 in the form of a pocket 27 originally comprising, in the XX axis and opposite its annular end part 26, an axial opening 31a is described. This process is designed to insert in an aseptic way—or in an at least protected way—a product such as a product P in powder form in the pocket 5 that is combined with the second piece 2, by means of the pocket 27 that forms the third piece 27.

The starting point is a situation in which a receptacle 4 that comprises a pocket 5, a second piece such as a port 2a, a first piece 1 with an opening 23 and a pocket 27 (third piece) that has an axial opening 31a opposite to the annular end part 26 is used, whereby this pocket 27 (third piece) is connected in a rigid and airtight way to the first piece 1, directly or indirectly by means of a tubular piece 24, as it was described above.

A closing piece 30 is combined with the annular end part 26 of the pocket 27 (third piece), and it is maneuvered in a suitable way for closing the passage that is formed by the latter.

With the pocket 27 (third piece) being always open owing to the opening 31a, opposite its annular end part 26 that is closed owing to the closing piece 30, the desired quantity of product P (FIG. 24A) is introduced into the pocket 27 by the opening 31a. Preferably, this stage is implemented whereas the opening 31a is placed in a higher position, for obvious reasons of ease, with the pocket 27 (third piece) extending downward and the pocket 5 being placed in a lower position.

Next, the opening 31a of the pocket 27 (third piece) is closed, for example by a transverse thermal welding 43a, or any other equivalent means. By so doing, the product P that is packaged in the pocket 27 (third piece) (FIG. 24B) is thus stored.

The first piece 1 is then mounted or assembled on and in the second piece 2, as disclosed above. In this situation, there is no communication between the pocket 27 (third piece) that contains the product P and the pocket 5 of the receptacle 4.

When it is desired that the product P is introduced into the pocket 5, the closing piece 30 is maneuvered in a suitable manner for opening the passage that is formed by the annular end part 26 of the pocket 27 (third piece).

With communication then being established between the pocket 27 and the pocket 5 of the receptacle 4, the product P that was previously stored in the pocket 27 (third piece) is sent into the pocket 5 of the receptacle 4. Preferably, this stage is implemented as above whereas the annular end part 26 of the pocket 27 (third piece) is placed in a lower position for obvious reasons of ease, with the product P being able to pass by gravity from the pocket 27 (third piece) to the pocket 5 of the receptacle 4 that is placed below.

Reference is now made more specially to FIGS. 25A and 25B whose object is a variant of the process that was just described.

In this variant of the process, a pocket 27 (third piece) that originally comprises not an axial opening 31a but a lateral opening 31c is used, with the pocket 27 (third piece) comprising a hooking means such as an eyelet 29 at its closed end part 31b.

This variant of the process is identical to the preceding one, except that the product P is inserted into the pocket 27 (third piece) not by an axial opening such as 31a but by the lateral opening 31c, the opening 31c of the pocket 27 (third piece) is next closed, for example by a thermal welding of axial and non-transverse direction 43b, and finally the pocket 27 (third piece) is conveniently held with its closed end part 31b in a higher position and its annular end part 26 is held in a lower position, by simple suspension by gravity, being suspended by the eyelet 29 with a suitable support hook.

Figure 26B:
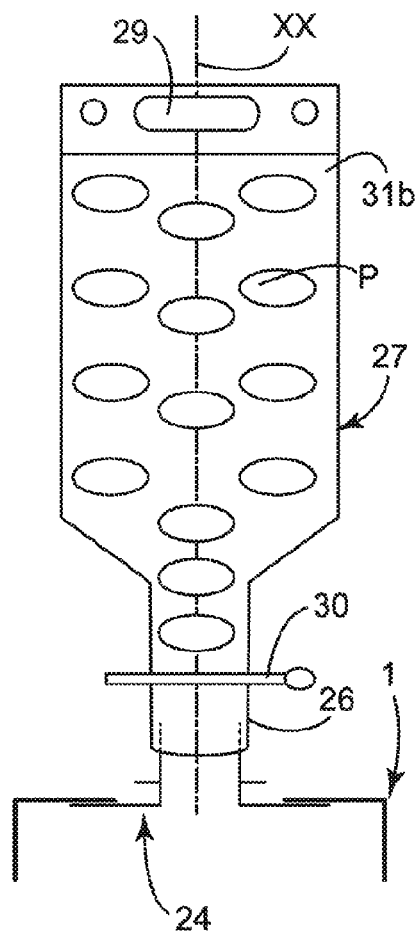

Reference is now made more specially to FIGS. 26A and 26B, and the process of using a unit that comprises—in addition to the pieces 1 and 2—a third piece 27 in the form of a pocket 27 (third piece) that has a closed end part 31b is described.

The starting point is a situation in which use is made of a receptacle 4 that comprises a pocket 5, a second piece such as a port 2a, a first piece 1 with an opening 23, and a pocket 27 (third piece) having a closed end part 31b, whereby this pocket 27 (third piece) is connected in a rigid and airtight way to the first piece 1, directly or indirectly by means of a tubular piece 24, as it was described above.

The desired quantity of the product P is introduced into the pocket 27 (third piece) by the terminal opening of the annular end part 26. Preferably (FIG. 26A), this stage is implemented for obvious reasons of ease, whereas the pocket 27 (third piece) is used with its annular end part 26 in a higher position and its closed end part 31b in a lower position, which is made possible by the fact that the tubular connecting piece 24 of the pocket 27 (third piece) with the first piece 1 comprises, as described above, a transverse collar 25 that works with the support wall 41 that is provided with a hole 42. The product P is then introduced into the pocket 27 (third piece) by simple gravity.

Then, a closing piece 30 is combined with the end part 26 of the pocket 27 (third piece), and it is maneuvered for closing the passage that is formed by the latter. The product P that is packaged in the pocket 27 (third piece) is thus stored.

The first piece 1 is then mounted or assembled on and in the second piece 2, as disclosed above. In this situation, there is no communication between the pocket 27 (third piece) that contains the product P and the pocket 5 of the receptacle 4.

When it is desired that the product P is introduced into the pocket 5, the closing piece 30 is maneuvered in a suitable manner to open the passage that is formed by the annular end part 26 of the pocket 27 (third piece).

With communication then being established between the pocket 27 and the pocket 5 of the receptacle 4, the product P previously stored in the pocket 27 (third piece) is sent into the pocket 5 of the receptacle 4.

Preferably, this stage is implemented after top-bottom turnaround of the pocket 27 (third piece), with the annular end part 26 of the pocket 27 (third piece) previously in a higher position being brought into a lower position, and the closed end part 31b previously in a lower position being brought into a higher position, with the pocket 27 (third piece) being suspended by gravity by the eyelet 29 with a suitable support hook. Thus, the product P can pass by gravity from the pocket 27 (third piece) to the pocket 5 of the receptacle 4 placed below.

The invention claimed is:

1. A mounting assembly for use in the biopharmaceutical field, the mounting assembly comprising:
a first piece configured to be mounted in a removable and airtight manner, on a rigid annular collar of a second piece having one end opening, the first piece, with respect to a central longitudinal axis, comprising:
a transverse wall configured to be received on the one end opening, and
a peripheral annular wall that forms a skirt, an interior surface of the peripheral annular wall being configured to come into contact with an exterior surface of the collar, the transverse wall and the skirt, in one piece, being made of a material that offers an inherent sealing for the biopharmaceutical field and having a high degree of flexibility such that, in an inactive state, the first piece has a specified natural shape to be curved without being degraded such that starting from the inactive state, the first piece is configured to be stretched transversely and expanded to be able to be slipped onto or slipped off of the second piece,
wherein
an interior surface of the transverse wall, which is one of continuous and solid, and having at least one passage opening comprises
a flat central zone, and
a marginal zone positioned on a periphery of the first piece,
when the first piece is combined with the second piece, the central zone of the interior surface of the transverse wall being essentially flat, and the marginal zone of the interior surface of the transverse wall having an essentially flat continuity relative to the central zone so as to form a part that is mated with an end edge of the collar that can be applied against the part and that is configured to contribute to sealing between the first and second pieces,
wherein an interior surface of the skirt comprises
a cylindrical part of larger diameter adjacent to the transverse wall,
a cylindrical part of smaller diameter that is separated from the transverse wall, and
a tilted, tapered intermediate part, in the active state where the first piece is mounted on the second piece, the parts of the skirt respectively contacting with elastic holding, tightening, and sealing on mating parts of the exterior surface of the collar of the second piece;
wherein the first piece, with quick installation and removal, seals the second piece when the transverse wall is one of continuous and solid and connected with communication to the second piece, when the transverse wall comprises the passage opening.

2. The mounting assembly according to claim 1, wherein the intermediate part of the interior surface of the skirt has a tapered shape, having a tilt of 45° with respect to the central axis.

3. The mounting assembly according to claim 1, wherein the transverse wall has a smaller thickness than that of the skirt and/or the thickness of the skirt facing the cylindrical part of larger diameter is greater than the thickness facing the cylindrical part of smaller diameter.

4. The mounting assembly according to claim 1, wherein the transverse wall comprises
the passage opening, and
a tubular piece, delimiting the passage opening, the tubular piece being made integral with the transverse wall to form a rigid unit that extends toward an exterior and/or an interior of the transverse wall, and
wherein the first piece, equipped with the tubular piece, ensures a function of connection and rigid attachment and passage or transfer, the tubular piece extending toward the exterior of the transverse wall and configured to accommodate and to attach, rigidly and in an airtight manner, an annular end part of a third piece.

5. The mounting assembly according to claim 4, further comprising a tubular piece that extends toward the exterior of the transverse wall, the tubular piece comprising a tubular wall for the accommodation and the rigid and airtight attachment of the annular end part of the third piece at an end of the tubular wall, with a collar for the rigid attachment to the part of the transverse wall forming the edge of the opening.

6. The mounting assembly according to claim 5, wherein the tubular piece comprises, toward an exterior of the tubular wall, an exterior cylindrical wall, the exterior cylindrical wall providing with the tubular wall an annular cylindrical housing that can accommodate the annular end part of the third piece or the tubular piece forming a rigid unit with a transverse collar, directed toward the exterior, the transverse collar being a means for suspension configured to suspend the third piece, the transverse collar working with a support wall that is provided with a hole.

7. The mounting assembly according to claim 1, wherein the transverse wall comprises the passage opening, and
a third piece that has an annular end part is configured to be attached directly to the part of the transverse wall that forms the edge of the opening, the third piece having either a shape of an open pocket or a not open pocket, opposite the annular end part, or a tube shape.

8. The mounting assembly according to claim 3, wherein a closing piece that is combined with the third piece, the closing piece being configured to open or close the passage that is formed by the annular end part.

9. The mounting assembly according to claim 1, further comprising
a first annular peripheral sealing means having a rounded bead shape in a transverse straight cross-section and located close to the skirt, and
a second mating annular peripheral sealing means having a rounded groove shape in the transverse straight cross-section, provided on the end edge of the collar.

10. The mounting assembly according to claim 1, further comprising at least one exterior peripheral tab that is adjacent to a free edge of the skirt and integral with the skirt, the at least one exterior peripheral tab being configured to assist the installation and/or the removal of the first piece on and/or from the collar of the second piece.

11. The mounting assembly according to claim 1, wherein at least the first piece is made of silicone or a material that has a Shore hardness on the order of 55 ShA and an elastic stretching capacity that is based on the size difference of the first piece between the inactive state and an intermediate state such that as much in the intermediate state as in the active state, the first piece has an elastic deformation relative to the inactive state where the first piece does not have an elastic deformation, and that in the active state, the elastic deformation is such that the first piece elastically tightens the collar of the second piece to ensure holding with sealing, the first piece being made of an antistatic material.

12. A unit designed for use in the biopharmaceutical field, comprising:
the mounting assembly comprising the first mounting piece according to claim 1; and the second piece on which the first mounting piece is mounted in a removable and airtight manner, the second, hollow piece comprising the end opening that is delimited by the rigid annular collar, a bulge at the side of the opening directed toward the exterior, wherein the exterior surface of the collar comprises a part of larger diameter toward the bulge and the opening, a part of smaller diameter separated from the bulge and the opening, and an intermediate part, and wherein in the active state where the first piece is mounted on the second piece, the parts of the skirt come into contact with elastic holding, tightening, and sealing on the mating parts of the exterior surface of the collar of the second piece, the first piece being configured for quick installation on and removal from the second piece.

13. The unit according to claim 12, further comprising a second sealing means formed as an annular groove provided on the end edge of the collar that forms the bulge, a first annular peripheral sealing means shaped as a rounded bead in a transverse straight cross-section and located close to the skirt configured to work with the second sealing means.

14. The unit according to claim 12, wherein the second piece is a port that is part of a storage or treatment receptacle, the receptacle comprising a pocket that has a bottom, an opening opposite the bottom that is configured to be combined rigidly with the second piece opposite the end opening, and a flexible lateral wall configured to be in two end states, respectively flat-folded and deployed, and in any intermediate state, the flexible lateral wall being configured to be deformed for passing from one state to another state.

15. The unit according to claim 14, wherein the receptacle further comprises means for treatment configured to treat contents of the receptacle, the means for treatment being integrated with the receptacle.

16. The unit according to claim 15, wherein the second piece that forms the port additionally constitutes means for protection configured to protect the treatment means, an active internal part of the treatment means being essentially arranged in the internal space of the second piece forming the port when the pocket is in the flat-folded state, a peripheral part of the internal space of the second piece forming the port that forms a chamber for protection of the pocket and the treatment means.

17. The unit according to claim 15, wherein the treatment means is arranged at least partly in an interior of the pocket by being adjacent to the bottom of the pocket, opposite the second piece that forms the port.

18. The unit according to claim 12, wherein the second piece is a tube.

19. The unit according to claim 12, wherein the transverse wall is continuous and solid, and the first piece is configured to seal the second piece.

20. The unit according to claim 12, wherein the transverse wall comprises the at least one passage opening, and the first piece is connected with communication to the second piece.

21. The unit according to claim 20, wherein further comprising a third piece comprising an annular end part that is connected in a rigid and airtight way to the first piece directly or by the tubular piece, and a closing piece combined with the annular end part of the third piece configured to open or close the passage that is formed by the annular end part.

22. A process for mounting or assembly of the first piece of the mounting assembly on the second piece of the unit according to claim 12, the process comprising:

providing the first piece and the second piece separately such that the first piece and the second piece are not mounted or assembled with one another;

expanding the first piece by providing external manual stress on at least the skirt of the first piece, the first piece being expanded by remaining in an elastic deformation range up to a diameter that is at least slightly larger than a maximum exterior diameter of the collar toward the opening;

positioning the first piece opposite and in the axis of the second piece; and disposing the skirt onto the collar, the first piece being positioned axially on the second piece in an unstressed position of the first piece;

wherein in a position in which the first piece, in the active state, is mounted or assembled on the second piece, the parts of the skirt come into contact with elastic holding, tightening, and sealing on the mating parts of the exterior surface of the collar of the second piece.

23. A process for disassembly of the first piece of the mounting assembly from the second piece of the unit according to claim 12, the process comprising:

expanding the first piece by providing an external manual stress at least on the skirt of the first piece, the first piece being expanded to a diameter that is at least slightly larger than a maximum exterior diameter of the collar toward the opening, when the first piece and the second piece are mounted or assembly with and on one another; and removing the first piece off of the second piece to disassemble the first and second pieces from each other.

24. A process for using the unit according to claim 12, the process comprising:

providing a receptacle for storage or treatment;

in an initial state in which a pocket of the receptacle is in the flat-folded state, the end opening of the port of the receptacle that forms the second piece being concealed by the first piece arranged toward the top and mounted on the second piece positioning the pocket by the bottom of the pocket on the bottom of a container;

gradually introducing a product into the receptacle through an opening that is opened and is configured to introduce the product from the receptacle, the pocket being simultaneously allowed to be deployed upward and to be expanded in volume by the container until a desired quantity of product has been introduced into the receptacle;

disassembling the first piece from the second piece, the end opening of the second piece thereby being opened;

introducing a product and/or a means of treatment and/or for measuring contents of the pocket the end opening having been opened into the pocket, and wherein after the product and/or the means of treatment and/or for measuring the contents of the pocket is introduced through the end opening, the first piece is mounted or assembled on and in the second piece.

25. The process for using the unit according to claim 24, wherein the receptacle comprises, treatment means integrated in the receptacle, the treatment means comprising mixing means arranged in an interior of the pocket by being adjacent to a bottom of the pocket, the process further comprising:

introducing the desired quantity of the product into the receptacle, the end opening of the port of the receptacle that forms the second piece being concealed by the first piece, the opening for introducing the product of the receptacle being open;

disassembling the first piece from the second piece, the end opening of the second piece thereby being opened; and introducing the desired quantity of the product by the end opening into the pocket, the end opening of the second piece being opened;

operating the mixing means;

mounting or assembling the first piece on the second piece; and continuing implementation of the mixing means.

26. The process for using the unit according to claim 22, wherein the unit further comprises a third piece being an open pocket opposite an annular end part, configured to insert a product into a receptacle via the third piece, the process further comprising:

providing the receptacle for storage or treatment, the receptacle comprising a pocket and the third connected in a rigid and airtight manner to the first piece;

combining a closing piece with the end part of the third piece, the closing piece close a passage that is formed by the annular end part;

introducing a desired quantity of the product into the third piece by the annular end part, the third piece being open opposite the closed annular end part;

closing the opening of the third piece opposite the closed annular end part;

mounting or assembling the first piece on the second piece, with no communication then existing between the pocket of the receptacle storage or treatment and the third piece;

maneuvering the closing piece to open the passage that is formed by the annular end part, with communication then being established between the pocket of the receptacle for storage or treatment and the third piece; and providing the product that is inserted into the third piece into the pocket of the receptacle for storage or treatment.

27. The process for using a unit according to claim 22, wherein the unit further comprises a third piece being a closed pocket opposite an annular end part, configured to insert a product into a receptacle via the third piece wherein the process further comprises:

providing receptacle for storage or treatment, the receptacle comprising a pocket and the third piece connected in a rigid and airtight manner to the first piece;

introducing a desired quantity of the product into the third piece by the annular end part, the third piece being open at the annular end part;

combining a closing piece with the end part of the third piece, the closing piece being maneuvered for closing a passage that is formed by the annular end part;

mounting or assembling the first piece on and in the second piece, with no communication then existing between the pocket of the receptacle for storage or treatment and the third piece containing the product;

maneuvering the closing piece to open the passage formed by the annular end part, with communication then being established between the pocket of the receptacle for storage or treatment and the third piece; and providing the product that is inserted into the third piece into the pocket of the receptacle for storage or treatment.

28. The mounting assembly according to claim 3, further comprising a third piece wherein a closing piece that is combined with the third piece and with the tubular piece, the closing piece being configured to open or close the passage that is formed by the annular end part.

29. The unit according to claim 20, further comprising a third piece comprising an annular end part that is connected in a rigid and airtight way to the first piece, directly or by the tubular piece, and a closing piece combined with the annular end part of the third piece and with the tubular piece, and configured to open or close the passage that is formed by the annular end part.

* * * * *